United States Patent [19]

Kondo

[11] Patent Number: 5,142,272
[45] Date of Patent: Aug. 25, 1992

[54] METHOD AND APPARATUS FOR PROCESSING DISPLAY COLOR SIGNAL

[75] Inventor: Tetsujiro Kondo, Kanagawa, Japan

[73] Assignee: Sony Corporation, Tokyo, Japan

[21] Appl. No.: 195,774

[22] Filed: May 19, 1988

[30] Foreign Application Priority Data

| May 21, 1987 | [JP] | Japan | 62-124709 |
| Sep. 16, 1987 | [JP] | Japan | 62-231762 |
| Sep. 17, 1987 | [JP] | Japan | 62-233325 |
| Sep. 24, 1987 | [JP] | Japan | 62-239460 |

[51] Int. Cl.$^5$ .............................................. G09G 1/28
[52] U.S. Cl. .................................. 340/701; 340/703; 358/17; 358/21 R
[58] Field of Search ............... 340/701, 702, 703, 767, 340/793; 358/17, 21 R

[56] References Cited

U.S. PATENT DOCUMENTS

| 4,233,601 | 11/1980 | Hankins et al. | 340/703 |
| 4,584,572 | 4/1986 | Lambert, III | 340/703 |
| 4,635,048 | 1/1987 | Nishi et al. | 340/703 |
| 4,639,771 | 1/1987 | Hattori et al. | |
| 4,654,720 | 3/1987 | Tozawa | 340/703 |
| 4,725,828 | 2/1988 | Cowlisha | 340/703 |
| 4,789,854 | 12/1988 | Ishii | 340/703 |
| 4,910,806 | 12/1989 | Iwai et al. | 340/703 |
| 4,933,230 | 3/1988 | Kurihara et al. | 340/703 |
| 4,986,893 | 11/1988 | Moore | 340/703 |

FOREIGN PATENT DOCUMENTS

| 3512784 | 5/1985 | Australia . |
| 6571586 | 6/1987 | Australia . |
| 0148659 | 7/1985 | European Pat. Off. . |
| 0234530 | 9/1987 | European Pat. Off. . |
| 8605340 | 9/1986 | World Int. Prop. O. . |

Primary Examiner—Ulysses Weldon
Assistant Examiner—M. Fatahi Yar
Attorney, Agent, or Firm—Alvin Sinderbrand; William S. Frommer

[57] ABSTRACT

A color video signal processing method and apparatus wherein the compressed display data of each pixel consists of a color identification code and a color saturation data relative to the color or luminance of the pixel having the maximum saturation change in comparison with an adjacent pixel, and where the original color data is reproduced from such display data. Furthermore, a plurality of representative colors are prepared per value of specific color, and the optimal color is selected per pixel to provide the display data. A distribution of color appearance frequencies is employed for determining the representative colors, and such colors are so selected as to have the maximum spectral distances from one another.

3 Claims, 13 Drawing Sheets

FIG. 12A

| | MSB | | | | LSB |
|---|---|---|---|---|---|
| dd(r) | 0 | 0 | 0 | r | (5 BITS) |
| dd(g) | 0 | 0 | 1 | g | (5 BITS) |
| dd(b) | 0 | 1 | 0 | b | (5 BITS) |
| dd(1) | 0 | 1 | 1 | g | (5 BITS) |
| dd(2) | 1 | 0 | 0 | g | (5 BITS) |
| dd(3) | 1 | 0 | 1 | g | (5 BITS) |
| dd(4) | 1 | 1 | 0 | g | (5 BITS) |
| dd(5) | 1 | 1 | 1 | g | (5 BITS) |
| | ← ID CODE → | | | ← SATURATION DATA → | |

FIG. 12B

| | MSB | | | | LSB |
|---|---|---|---|---|---|
| dd(r) | 0 | 0 | | r | (6 BITS) |
| dd(g) | 0 | 1 | | g | (6 BITS) |
| dd(b) | 0 | 0 | | b | (6 BITS) |
| dd(1) | 1 | 1 | 0 | 0 | g (4 BITS) |
| dd(2) | 1 | 1 | 0 | 1 | g (4 BITS) |
| dd(3) | 1 | 1 | 1 | 0 | g (4 BITS) |
| dd(4) | 1 | 1 | 1 | 1 | g (4 BITS) |
| | ← ID CODE → | | | ← SATURATION DATA → | |

FIG. 15
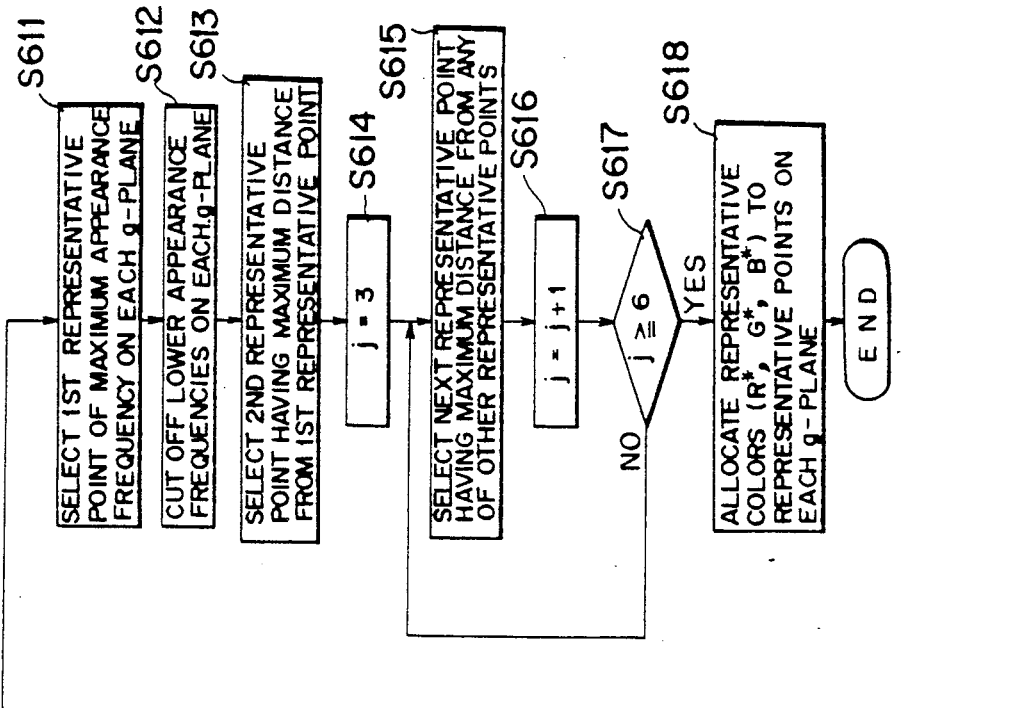
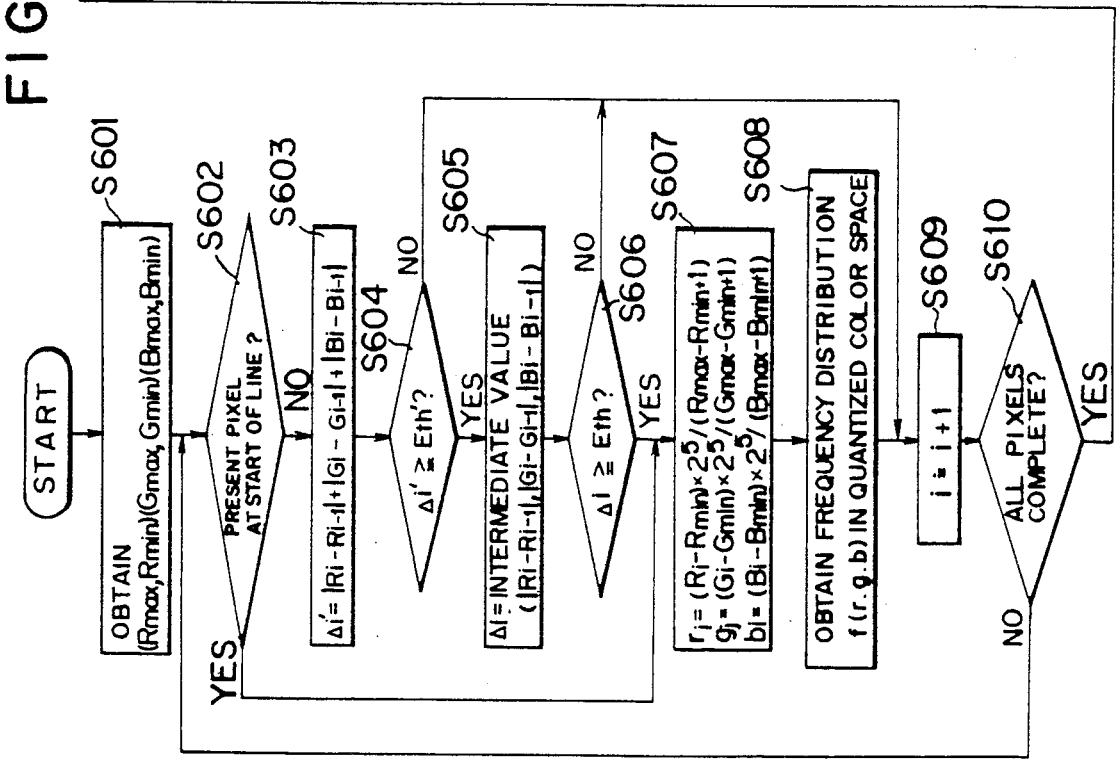

METHOD AND APPARATUS FOR PROCESSING DISPLAY COLOR SIGNAL

BACKGROUND OF THE INVENTION

1. Field of the Invention

The present invention relates to a method and an apparatus for processing a color video signal.

2. Description of the Prior Art

It has been known heretofore that, in computer graphics for example, a capability of displaying 256 ($=2^8$) colors per pixel is generally required. In other words, that requirement is satisfied by allocating 8 bits to each pixel.

Recently, however, there are cases in which another requirement exists for the processing or displaying of a natural picture such as an image picked up by a video camera. In such a case, the conventional 256-color display capability is not sufficient.

In the case of a computer graphics system equipped with a display function of 2048 pixels×2048 pixels, if 8 bits are allocated to each of the red, green and blue colors in one pixel to increase the color display capability per pixel, it follows that a total of 24 bits are needed for each pixel, and therefore the total of the bits required for a complete image or frame is

```
24 bits × 2048 pixels × 2048 pixels
= 100,663,296 bits
= 12,582,912 bytes
≃ 12 megabytes
```

Thus, the display memory required has become excessive in size. In addition, an extended time period is necessary for processing the image. Even if a hard disk drive is employed only a few frames of images can be stored. As a result, satisfactory adaptability for practical use is unattainable.

As a solution for the above problems, there is a known method of extending the color display capability by means of a color look-up table while still allocating 8 bits per pixel. An example of such a color look-up table might consist of memories having 4 addresses each composed of 8 bits and designated by 2-bit red and blue address signals respectively, and also 16 addresses designated by 4-bit green address signals, with 8-bit color saturation data being stored in each address. A total of 24 such addresses are, designated by 8-bit color look-up table address signals stored in the addresses corresponding to the individual pixels in the display memory. Accordingly, although merely 256 addresses are selectable in the color look-up table, a total of 16,777,216 values can be derived since the output of the color look-up table is composed of 24 bits in all. Therefore, despite the limited simultaneous display of merely 256 colors in one frame, it is rendered possible to display a total of 16,777,216 colors by rewriting the contents of the color look-up table during a blanking interval or the like. Consequently, due to the use of such a color look-up table, many hues and gradations (color saturations or values of color components) are representable, even with limited display memory capacity, resulting in the display of a colorful image.

However, even in the aforementioned technique, the kinds of colors reproduced may be insufficient to bring about naturalness with respect to the luster and tint. For example, in displaying lustrous fruits, merely 2 bits are allocated to red and blue respectively and, due to there being only four gradations, quantization is rendered conspicuous with color changes appearing like stripes.

In addition to the above, since merely 8 bits/3≃2.7 bits on average are allocated with respect to each of red, green and blue, there arises a problem of insufficiency in the gradations with further disadvantages including reduction of the resolution and deterioration of the picture quality.

OBJECTS AND SUMMARY OF THE INVENTION

It is therefore an object of the present invention to provide a novel color video processing method and apparatus capable of eliminating the above-described drawbacks observed in the prior art.

In particular, a principal object of the present invention resides in the provision of a color video processing method and apparatus adapted to increase the number of colors that may be generated simultaneously.

Another object of the invention is to provide a color video processing method and apparatus capable of producing a high resolution display.

A further object of the invention is to provide a color video processing method and apparatus which eliminates the necessity for a large capacity memory unit.

An even further object of the invention is to provide a color video processing method and apparatus which avoid the appearance of a color blur in any image part having great luminance change, such as a boundary between black and white portions.

Still another object of the invention resides in providing a color video processing method and apparatus which maintains sufficient gradation even at a boundary having great luminance change across it.

Yet another object of the invention is to provide a color video processing method and apparatus capable of preventing deterioration of the picture quality at any part of the image such as at its edge or at the start of each line.

According to one aspect of the invention, there is provided a method for processing a color display signal, comprising the steps receiving a series of display data each containing identification data to specify the selected one of a plurality of color components and a luminance component of the respective color pixel data and the code data corresponding to a value thereof; generating color data having a color specified by the identification data of each display data and having a value corresponding to the code data; and holding the color data until the same identification data is received again.

According to another aspect of the invention, there is provided an apparatus for processing a color display signal, comprising means for receiving a series of display data each having an identification data to specify the selected one of a plurality of color components and a luminance component of the respective color pixel data and the code data corresponding to a value thereof; means for generating color data having a color specified by the identification data of each display data and having a value corresponding to the code data; and means for holding the color data until the same identification data is received again.

According to a further aspect of the invention, there is provided a method for processing a color signal, comprising the steps of receiving a series of color pixel data; comparing the value of at least two data of a plurality of color components and a luminance of the present color pixel data with the respective neighboring previous pixel data; selecting one of the plurality of color components or the luminance included in the present color pixel data having the maximum differential value in comparison with the corresponding components of the previous color pixel data; generating identification data to indicate the selected one of the plurality of color components and the luminance; and combining the identification data and the code data corresponding to the value of the selected components so as to generate display data.

According to an even further aspect of the invention, there is provided a method for processing a color signal, comprising the steps of receiving a series of color pixel data; obtaining a value of a predetermined color component of the present color pixel data; providing a representative color data corresponding to the value of the predetermined color component; generating respective residual error values between previous color pixel data and predicted color pixel data when the previous color pixel data is assumed to be replaced with color pixel data having predicted color components; comparing the respective residual error values; selecting one of sets of a plurality of color components providing the minimum residual error values corresponding to the present color pixel data; generating identification data specifying the selected one of the sets of a plurality of color components; and combining the identification data and code data corresponding to the value or values of the selected one so as to generate display data.

According to a still another aspect of the invention, there is provided a method of processing a color signal comprising the steps of receiving a series of color pixel data; generating respective residual error values between previous color pixel data and predicted color pixel data when only one of a plurality of color components and a luminance of the previous color pixel data is assumed to be replaced with that of the present color pixel data; comparing the respective residual error values; selecting one of the plurality of color components or the luminance providing the minimum residual error values corresponding to the present color pixel data; generating identification data for indicating the selected one of the plurality of color components and luminance; and combining the identification data and code data corresponding to the value of the selected one so as to generate display data.

According to yet another aspect of the invention, there is provided a method for processing a color signal, comprising the steps of receiving a series of color pixel data of a space to be subjected to the process; obtaining the distribution of the frequency of appearance of colors in the space to be subjected to the process; selecting the color having the maximum frequency of appearance as the first representative color; and selecting the color having the farthest spectral distance from the first representative color in a predetermined range of the frequency of appearance as the second representative color.

BRIEF DESCRIPTION OF THE DRAWINGS

FIGS. 12A and 12B are conceptual diagrams illustrating the composition of the video display data formed by the compression method of FIG. 11;

FIG. 15 is a flow chart of a second embodiment of the method of choosing a representative color.

DETAILED DESCRIPTION OF THE PREFERRED EMBODIMENTS

Hereinafter the present invention will be described with reference to the accompanying drawings which show color video display devices incorporating obtained color video signal processing methods and apparatus according to embodiments of the invention.

Figure 1:
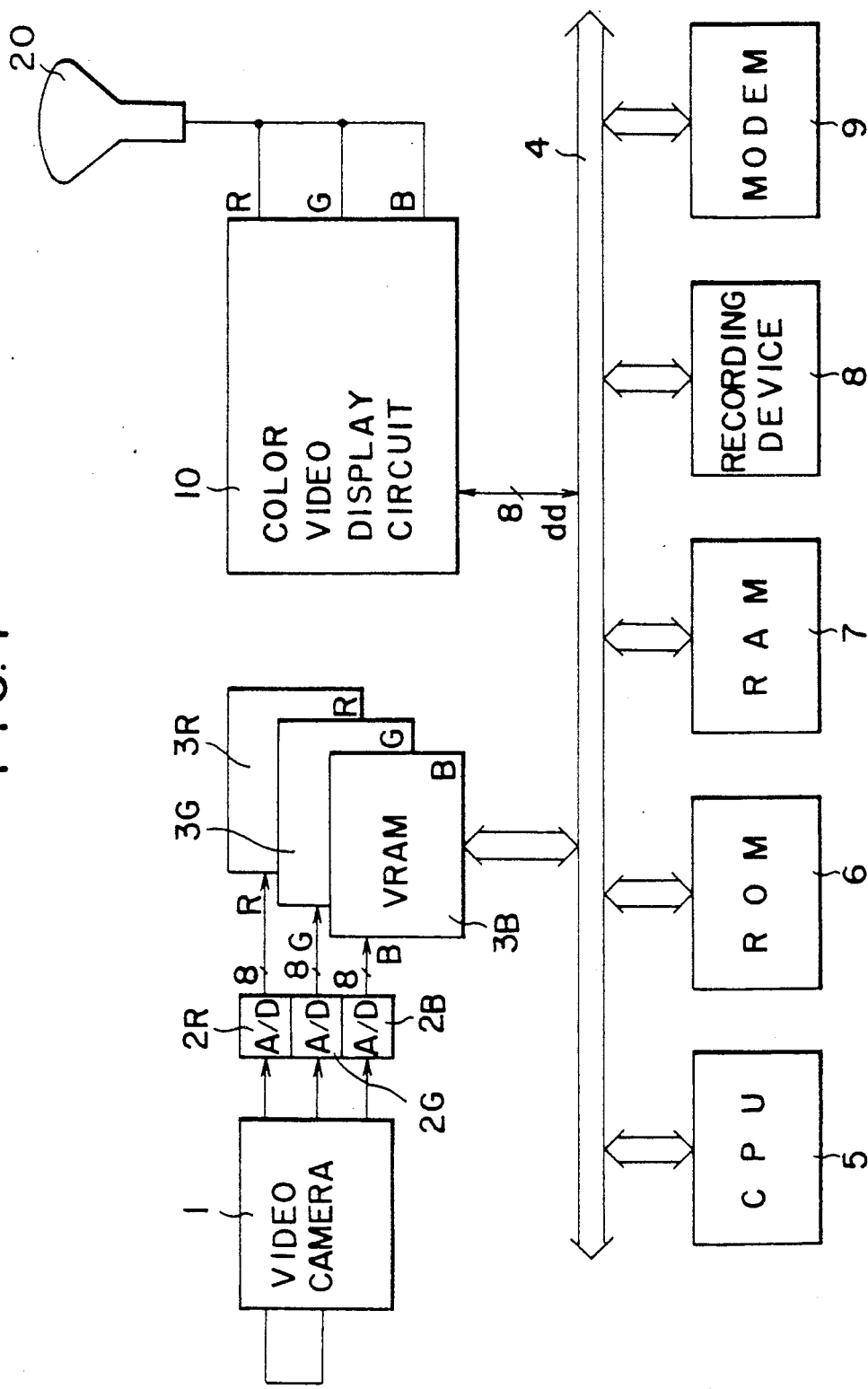
FIG. 1 is a block diagram of a color video signal processing apparatus embodying the present invention.

FIG. 1 is a block diagram of such a color video display apparatus as a whole. Three primary color signals (red, green and blue) of a color image obtained from a color image input device such as a video camera 1 are converted to digital primary color data R, G, B, each of which is composed of 8 bits, by analog-to-digital (A/D) converters 2R, 2G, 2B respectively, and then are stored temporarily in so-called video memories such as random access memories (RAMs) 3R, 3G, 3B each having a capacity of 2048×2048 pixels×8 bits. Such memories 3R, 3G, and 3B are connected to a main bus 4, to which a central processing unit (CPU) 5, a read only memory (ROM) 6, and a RAM 7 are also connected. Color data compression is performed in the above arrangement by the method to be described later, in such a manner that the digital primary color data, in which each color is composed of 8 bits (24 bits per pixel), are compressed to data dd of 8 bits per pixel. Such compressed data dd are then stored on a recording device 8, such as a hard disk or floppy disk, or are transmitted through a communications apparatus such as a modulator-demodulator (MODEM) 9. A color video display circuit 10 is also connected to the main bus 4 and is supplied with the compressed color display data dd (8 bits per pixel). The color display data dd are then restored in the color video display circuit 10 to the three primary color data R', G', B' of the former 24 bits per pixel where each color is composed of 8 bits, and then are processed through digital-to-analog conversion to become analog primary color signals, which are fed to a color monitor CRT (cathode-ray tube) 20.

A first embodiment of a color data compression method according to the invention will now be described with reference to the flow chart of FIG. 2. The digital primary color data R, G, B corresponding respectively to the saturations of the three primary colors (red, green, blue) of a color image are obtained by directly digitizing the original precompression data which consists of the three primary color signals outputted from a video camera or the like, such that the data of each color is composed of 8 bits per pixel (24 bits for the entire three primary colors). Such three primary color data R, G, B, of 24 bits per pixel are then compressed adaptively for the individual pixels of a color image as will be described later, so that display data dd of 8 bits per pixel is obtained. The 8-bit display data dd has the data format of FIG. 3, where the three kinds of data dd(r), dd(g), dd(b) are set corresponding to the individual primary colors, and the selection of such data is determined adaptively in accordance with the absolute value of the difference between the digital primary color data of the adjacent pixels. With regard to the three digitized primary color data R, G, B in FIG. 2, the primary color data of the ith pixel in one image are represented by Ri, Gi, Bi, respectively.

Figure 2:
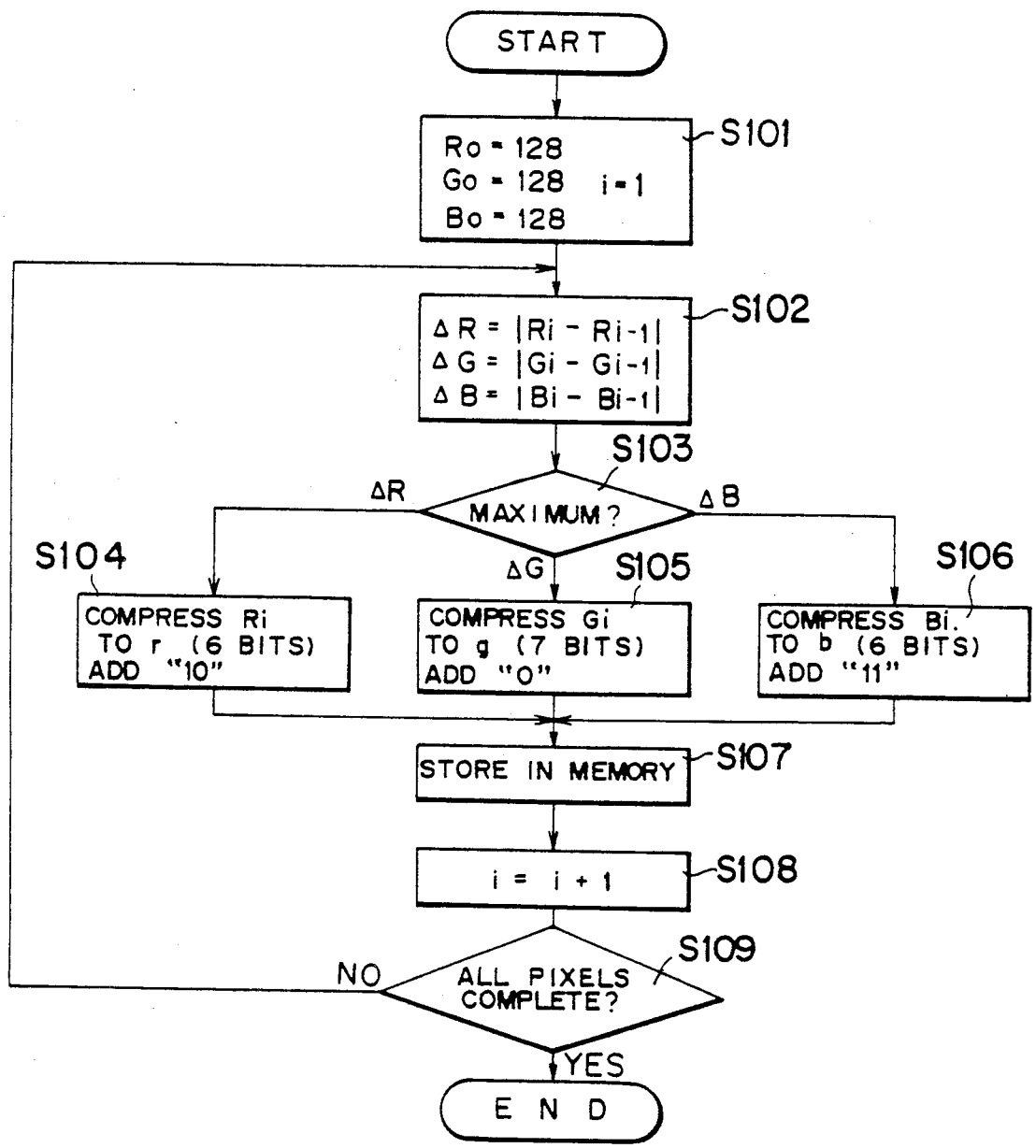
FIG. 2 is a flow chart of a first method to encode the color signal compressed data according to the invention.

First, in a step S101 shown in FIG. 2, values $R_0$, $G_0$, $B_0$ of the three digitized primary color data R, G, B are initialized as $$R_0 = 128, \; G_0 = 128, \; B_0 = 128$$

and a count parameter i (corresponding to the pixel number) is set as 1 (i=1). Subsequently in step S102, there are calculated the absolute values $\Delta R$, $\Delta G$, $\Delta B$ of the respective differences between the primary color data Ri, Gi, Bi of the ith pixel and the primary color data $R_{i-1}$, $G_{i-1}$, $B_{i-1}$ of the (i−1)th pixel which is immediately anterior to the ith pixel.

$$\Delta R = |R_i - R_{i-1}|$$

$$\Delta G = |G_i - G_{i-1}|$$

$$\Delta B = |B_i - B_{i-1}|$$

Figure 3:
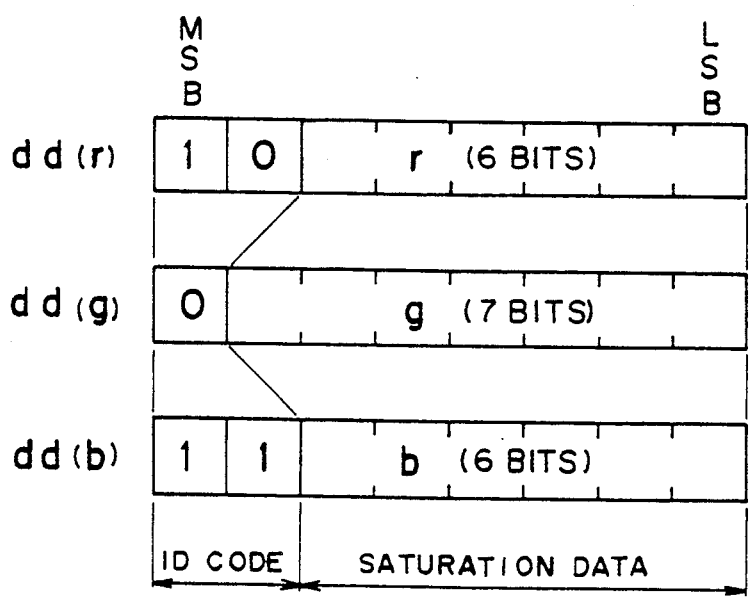
FIG. 3 is a conceptual diagram illustrating the composition of the video display data formed by the compression method of FIG. 2.

In a next step S103, the maximum of the above absolute values $\Delta R$, $\Delta G$, $\Delta B$ is discriminated, and the digital primary color data corresponding to the color of such maximum value is compressed to the individual color saturation data consisting of 6 or 7 bits in the following steps S104, S105 and S106, where an identification code of 1 or 2 bits identifying the color is added to the 7 or 6 bits, respectively, of saturation data to produce the 8-bit display data format shown in FIG. 3.

When the value of $\Delta R$ is judged to be the maximum ($\Delta R > \Delta G$, $\Delta R > \Delta B$) in step S103, the process advances to step S104, where the 8-bit digital red data Ri is compressed to the 6-bit red saturation data r, an additional two bits "10" of red identification code are then added to the high-order side (MSB side) of the compressed data, thereby forming the 8-bit display data dd(r) as a whole. In a case where the value of $\Delta G$ is judged to be the maximum ($\Delta G > \Delta R$, $\Delta G > \Delta B$) in step S103, the process advances to step S105 where the 8-bit digital green data Gi is compressed to the 7-bit green saturation data g, an additional one bit "0" of green identification code is then added to the MSB side of the compressed data, thereby forming the 8-bit display data dd(g). In a case where the value of $\Delta B$ is judged to be the maximum ($\Delta B > \Delta R$, $\Delta B > \Delta G$) in step S103, the process advances to step S106 where the 8-bit digital blue data Bi is compressed to the 6-bit blue saturation data b, an additional two bits "11" of blue identification code are then added to the MSB side of the compressed data, thereby forming the 8-bit display data dd(b).

Figure 4:
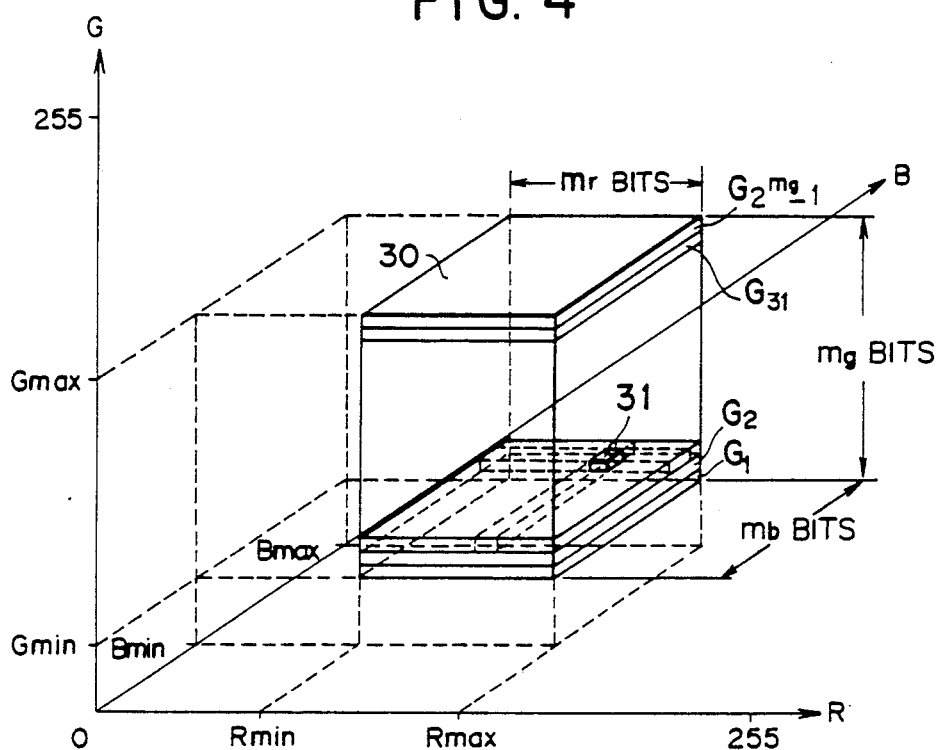
FIG. 4 is a conceptual diagram of a color space which explains the color signal compression method of the invention.

A way of carrying out such a color data compression method will now be described in detail below. Fundamentally, the data of 8 bits are converted to data of a smaller number of bits. The following is an example of a case where mapping is performed by allocating m-bit compressed data corresponding to the color saturation of the effective region in accordance with the color saturation distribution represented by the original data. Therefore the display data dd(r), for instance has a sufficiently high quantization level even though its color saturation information is composed of only 6 bits. More specifically, an example is illustrated in FIG. 4 where Rmax, Gmax, Bmax denote the respective maximum values of the primary color components of the colors used in, e.g. one frame of the color image being presently processed in the color space representable by the digital primary color data R, G, B each composed of 8 bits; and where Rmin, Gmin, Bmin denote the respective minimum values of such primary color components. In this example, color data compression is performed by requantizing the primary color data R, G, B within such ranges to the primary color saturation data r, g, b composed of mr, mg, mb bits respectively, in the above format. In the calculation of the primary color saturation data r, g, b in such a requantization, for instance, the saturation data r can be calculated as follows.

Figure 5:
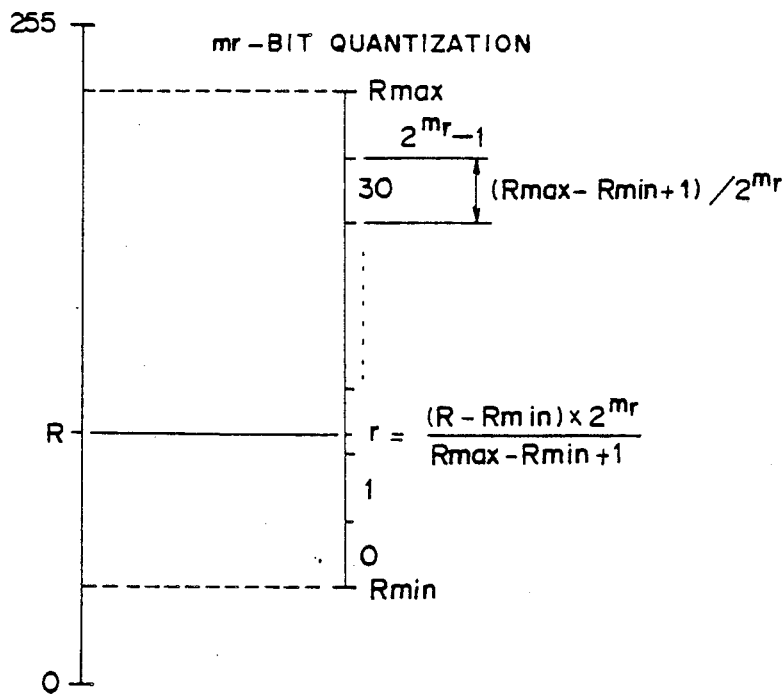
FIG. 5 is a conceptual diagram which explains an example of the color signal compression method of the invention.

As shown in FIG. 5, since the original data R is composed of 8 bits, the gradation has a value in the color space ranging from 0 to 255, whereas the requantized data r has a value obtained by projecting the data R into a range of the gradation spanning Rmin to Rmax. Therefore, when $m_r = 5$, $$r = (R - Rmin) \times 2^5 / (Rmax - Rmin + 1) \tag{1}$$

Similarly, when $m_g = 6$ and $m_b = 5$, $$g = (G - Gmin) \times 2^6 / (Gmax - Gmin + 1) \tag{2}$$

$$b = (B - Bmin) \times 2^5 / (Bmax - Bmin + 1) \tag{3}$$

Subsequently, in step S107 on FIG. 2, the color display data dd(r), dd(g) or dd(b) formed in the previous step S104, S105 or S106 is stored, as display data representing the ith pixel, at the ith address in a memory 7 serving as a storage means. The process then advances to step S108 where the aforementioned count parameter i is incremented by 1. In a next step S109, a decision is made as to whether the above process has been executed completely with regard to all pixels. When the result of such a decision is NO, the process then returns to step S102; whereas if the result is YES, the entire process regarding one image is considered to be complete.

It follows, therefore, that the saturation information of the color having the maximum level change in comparison with the preceding pixel is stored as the data in the memory 7.

Figure 6:
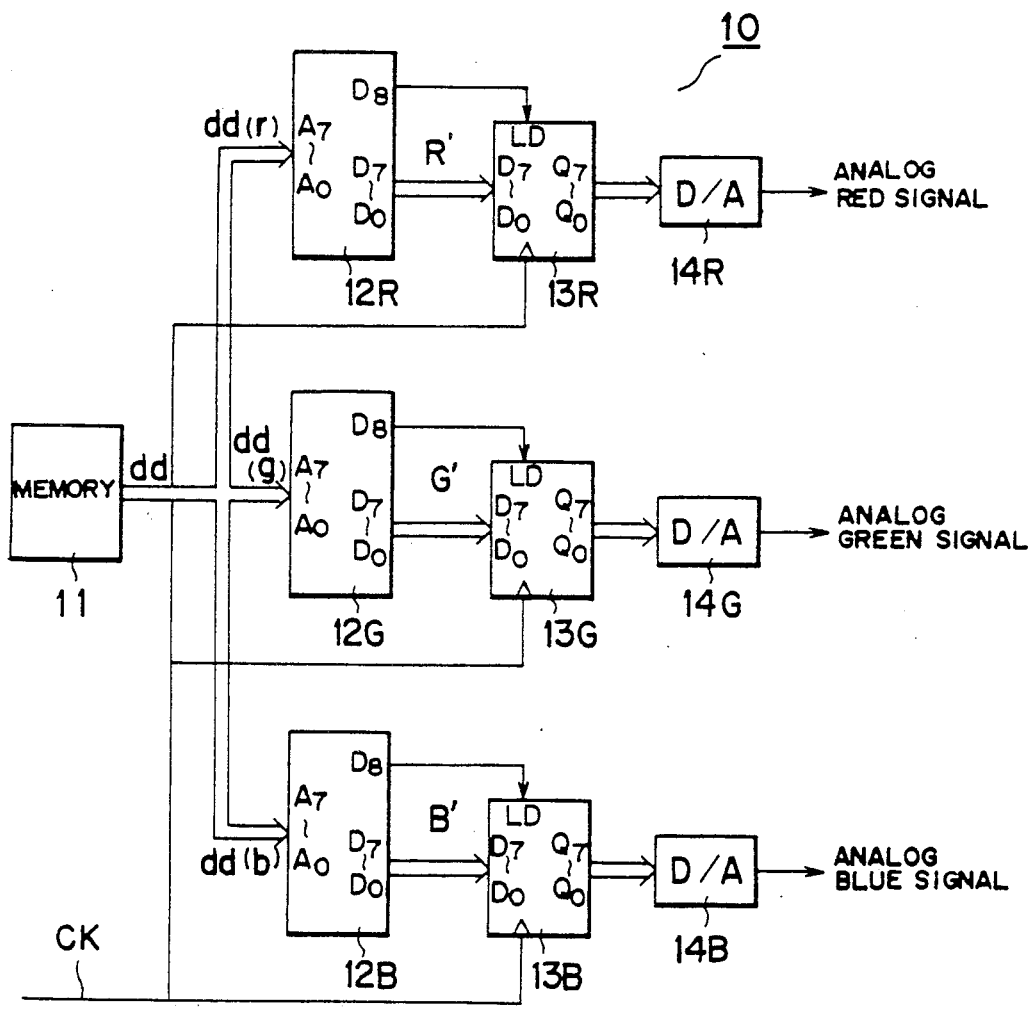
FIG. 6 is a block diagram of a color video display circuit of the present invention.

Referring now to FIG. 6, it will be seen that the color video display circuit 10 of FIG. 1, when designed for displaying a color image by the use of such color display data compressed by the above-described method, comprises a display memory 11 having a capacity of (pixels of one image×8) bits, and the color image display data dd (8 bits per pixel) is read out, synchronously with clock pulses CK, from the addresses corresponding to the horizontal and vertical scanning in a color display tube. Such 8-bit data dd is the one processed by the aforementioned data compression method. Accordingly, relative to each pixel data read out and transmitted from the memory 7, the color having the maximum level change (color saturation change) in comparison with the preceding pixel, the identification code and the saturation data of such color are stored as the display data dd in the display memory 11 of FIG. 6. The 8-bit display data dd read out from the memory 11 is fed as an address to the memory 12R, 12G or 12B for the Color look-up table.

Each of the memories 12R, 12G and 12B for the color look-up table has a capacity of 256 addresses accessible by the 8-bit display data dd, where each address is composed of 9 bits. In the red memory 12R, predetermined conversion table data have been previously stored in a manner such that, when the two high-order or most significant bits A7 and A6 of the address A7 to A0 have become "10" of red identification code, the most significant bit D8 of the 9-bit output data D8 to D0 is changed to a "1" signifying a renewal instruction, and the 8-bit digital red data R' is outputted to datalines D7 to D0 in accordance with the saturation data r fed to the six less significant bits A5 to A0 of the address. More specifically, as the data content of the memory accesses addresses 80H to BFH (where H denotes hexadecimal notation) in the address space of the memory 12R, "1" is written in D8, and red data R' of the color space, displayed in accordance with the aforementioned 6-bit saturation data r, is written in D7 to D0. Meanwhile in the green memory 12G, predetermined conversion table data have been previously stored in the addresses 0 to 7FH in a manner such that, when the most significant bit A7 of the address A7 to A0 becomes "0", that is, the green identification code, the most significant bit D8 of the 9-bit output data lines D8 to D0 is changed to a "1", and the 8-bit digital green data G' is outputted to datalines D7 to D0 in accordance with the saturation data g which is fed to the seven least significant bits A6 to A0 of the address. Further in the blue memory 12B, the conversion table data have been previously stored in addresses COH to FFH in a manner such that, when the two most significant bits A7 and A6 of the address A7 to A0 become "11", that is, the blue identification code, the most significant bit D8 of the 9-bit output data D8 to D0 is changed to a "1", and the 8-bit digital blue data B' is outputted to D7 to D0 in accordance with the saturation data b fed to the six less significant bits A5 to A0 of the address. Instead of using such memories 12R, 12G, 12B for the color look-up table, other circuits may be employed for converting, by inverse arithmetic calculations based on Eqs. (1), (2) and (3), the compressed saturation data r, g, b into digital primary color data R', G', B' each composed of 8 bits.

To latch circuits 13R, 13G, 13B, there are fed the eight less significant data bits D7 to D0 of the memories 12R, 12G, 12B, i.e. the digital red data R', digital green data G' and digital blue data B'. Furthermore, the most significant data bits D8 of the memories 12R, 12G, 12B are also fed as latch enable signals to the latch circuits 13R, 13G, 13B, respectively. It follows, therefore, that the preceding data is held with regard to the color represented by "0" of the most significant data bit D8, and the data is renewed merely with regard to the color represented by a "1" at data bit D8.

In case the data dd obtained from the memory 11 is red data dd(r) for instance, since its two most significant bits are "10", only the most significant bit D8 of the output data from the memory 12R becomes a "1" and enables the latch circuit 13R to latch the eight less significant bits D7 to D0 of the data, so that the red signal R is obtained from a respective D/A converter 14R.

Since the data dd are fed also to the memories 12G and 12B at this time, the data G' and B' are outputted respectively from the memories 12G and 12B. However, as the two most significant bits of the data dd are "10", the most significant bits D8 of the data outputted from the memories 12G and 12B do not become "1", and therefore the data G' and B' are not latched by respective latch circuits 13G and 13B. Thus, the preceding data G' and B' latched anterior thereto are maintained as such.

Such state in the latch circuit 13R 11 is retained until the next red data dd(r) is read out from the memory 11, i.e. until the red saturation change becomes greater than the saturation change of some other color.

In the case where the data dd read out from the memory 11 is green data dd(g) or blue data dd(b), the most significant bit D8 of the output data from the memory 12G or 12B becomes "1" in accordance With the most significant bit or two most significant bits thereof, so that the eight most significant bits D7 to D0 of the data dd(g) or dd(b) are latched by the latch circuit 13G or 13B, whereby the green signal G or the blue signal B is taken out from the D/A converter 14G or 14B.

The operations of such latch circuits 13R, 13G and 13B proceed in accordance with the aforementioned clock pulses CK, and the output data from the latch circuits 13R, 13G and 13B are converted to red, green and blue analog primary color signals by the D/A converters 14R, 14G and 14B respectively. Such analog primary color signals are then fed to the color monitor CRT 20 (FIG. 1) and so forth to display a color image.

According to the above-described technique where 6 bits are allocated to each of red and blue and 7 bits to green respectively, it becomes possible to execute a 19 bit color representation even though the display data consists of only 8 bits per pixel hence achieving simultaneous display of $2^{19}$ (=524,288) colors in one image. Consequently, even a natural picture can be displayed with sufficient gradation so as to attain a satisfactory color image while maintaining desired naturalness and high picture quality. Furthermore, with regard to any color having the maximum saturation change, the post-change display is executed with priority to eventually minimize deterioration of the resolution.

Besides the above, the color identification code is merely added to the data of the color having the maximum saturation change, thereby eliminating the necessity of an increased capacity of the memory 11. Moreover, no particular color compression circuit is needed, and the required operation can be performed by mapping through the memories 12R to 12B.

In the above example, if the latch enable signals from the most significant bits of the data dd to the latch circuits 13R to 13B are formed by the use of AND gates and inverters, the memories 12R to 12B may be such that each address thereof has a capacity of 8 bits. In this case. the sequence of the memories 12R to 12B and that of the latch circuits 13R to 13B can be reversed.

Although the above embodiment is contrived so that the data dd is first stored in memory 7 in step S107, the data may also be directly stored in memory 11. The procedure shown in FIG. 2 can be realized by either software or hardware.

Figure 7:
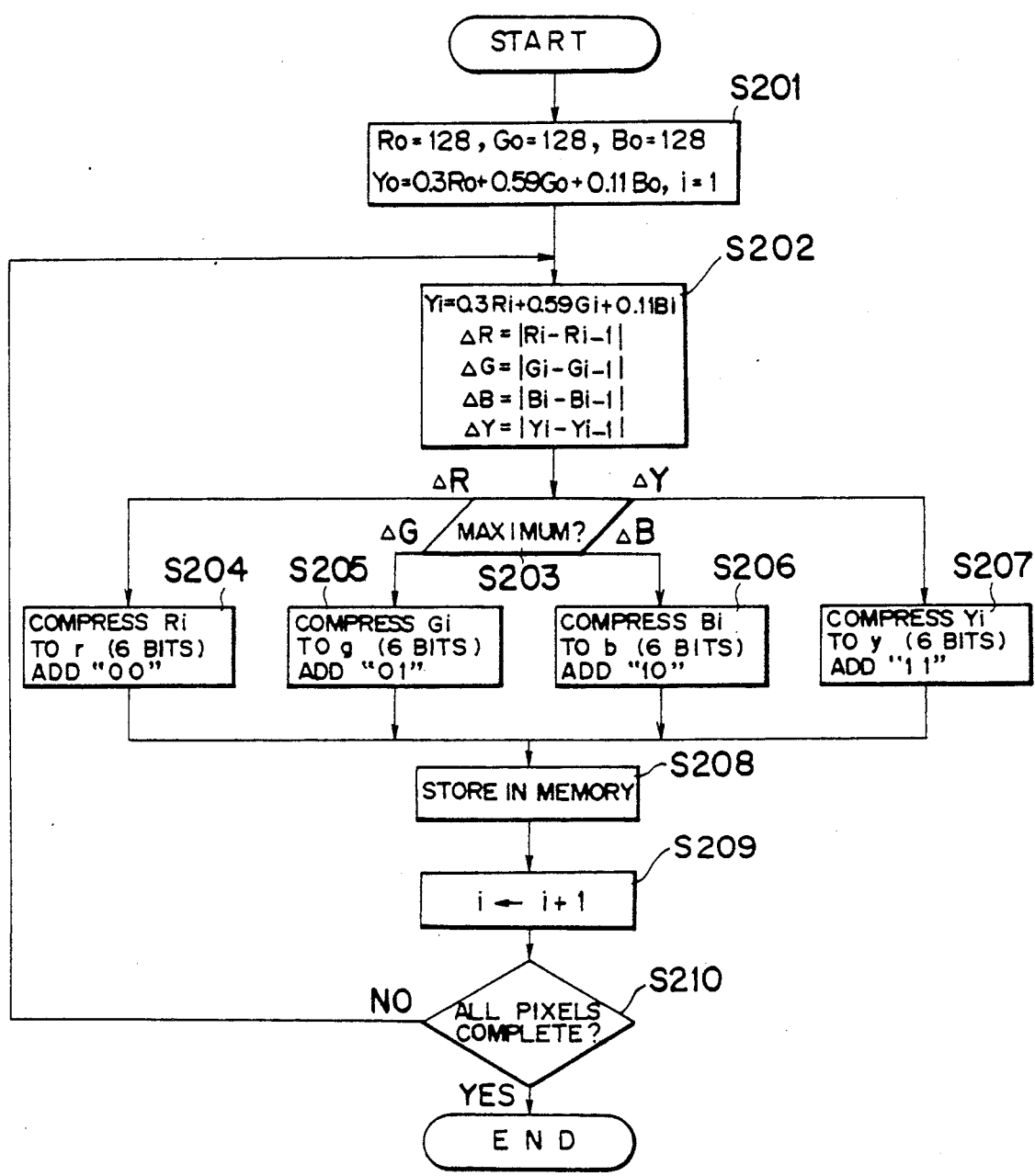
FIG. 7 is a flow chart of a second method of encoding the color signal compressed data according to the invention.

A second embodiment for carrying out the method of color data compression will now be described with reference to the flow chart of FIG. 7. However, the explanation is simplified with respect to the steps corresponding to those in the aforementioned first embodiment of FIG. 2.

Figure 8:
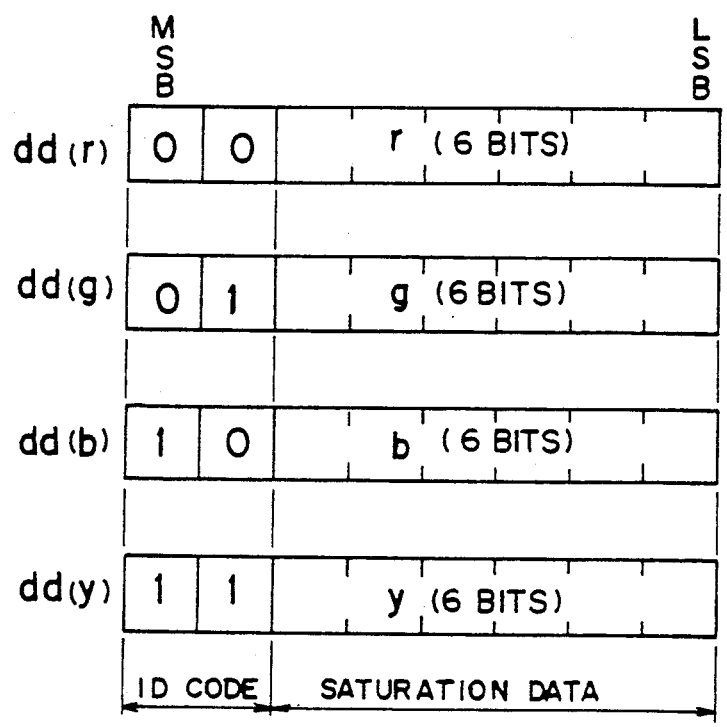
FIG. 8 is a conceptual diagram illustrating the composition of the video display data formed by the compression method of FIGS. 7 and 10.

The 8-bit display data dd processed by such compression method has the data format shown in FIG. 8.

First, in step S201, initial values are set as $$R_0 = 128, G_0 = 128, B_0 = 128$$

$$Y_0 = 0.3\ R_0 + 0.59\ G_0 + 0.11\ B_0, i = 1$$

In the next step S202, luminance data Yi of the ith pixel is calculated from the data Ri to Bi as follows:

$$Yi = 0.3\ Ri + 0.59\ Gi + 0.11\ Bi$$

There are also calculated the absolute values $\Delta R$, $\Delta G$, and $\Delta Y$ of the respective differences between the data Ri to Yi of the ith pixel and the data $R_{i-1}$ to $Y_{i-1}$ of the preceding pixel.

$$\Delta R = |Ri - R_{i-1}|$$

$$\Delta G = |Gi - G_{i-1}|$$

$$\Delta B = |Bi - B_{i-1}|$$

$$\Delta Y = |Yi - Y_{i-1}|$$

Subsequently in step S203, the maximum of the absolute values $\Delta R$ to $\Delta Y$ is discriminated.

When the value $\Delta R$ is judged to be the maximum ($\Delta R > \Delta G$, $\Delta R > \Delta B$), the process advances to a step S204 where the 8-bit digital red data Ri is compressed to 6-bit red saturation data r and, as shown in FIG. 8, two bits "00" of red identification code are added to the MSB side of the compressed data r, thereby forming the 8-bit display data dd(r) as a whole.

In the case where the value $\Delta G$ is judged to be the maximum ($\Delta G > \Delta R$, $\Delta G > \Delta B$, $\Delta G > \Delta Y$) in step S203, the process advances to step S205 where the 8-bit digital green data Gi is compressed to 6-bit green saturation data g, and further two bits "01" of green identification code are added to the MSB side of the compressed data, thereby forming the 8-bit display data dd(g) as a whole.

If the value $\Delta B$ is judged to be the maximum in step S203, the process advances to step S26 where the 8-bit digital blue data Bi is compressed to 6-bit blue saturation data b, and two bits "10" of blue identification code are added to the MSB side of the compressed data b, thereby forming the 8-bit display data dd(b) as a whole.

Furthermore, in another case where the value $\neq Y$ is judged to be the maximum in step S203, the process advances to step S207 where the 8-bit digital luminance data Yi is compressed to 6-bit luminance data y, and two bits "11" of luminance identification code are added to the MSB side of the compressed data, thereby forming the 8-bit display data dd(y) as a whole. The above compression is performed in the same manner as in the aforementioned first embodiment.

Subsequently in the next step S208. the data dd(r), dd(g), dd(b) or dd(y) formed in one of the previous steps S204 to S207 is stored as ith pixel display data in the ith address of the memory 7. Thereafter in a step S209, the count parameter i is incremented by 1 so as to process the next pixel. In a step S210. a decision is made as to whether the above process has been completed with regard to all pixels and, if any pixel is left unprocessed, the procedure following step S202 is repeated.

Thus, there is stored in the memory 7 the saturation information as the data dd relative to the color or luminance having the maximum level change in comparison with the preceding pixel.

In the first and second embodiments for carrying out the display data forming method mentioned above, the operations shown in FIGS. 2 and 7 may be performed continuously for each image. However, considering the horizontal correlation, it is desired that initialization be executed per line.

In the steps S102 and S202, the present pixel data such as Ri is compared with the preceding pixel data $R_{i-1}$. However, for further error reduction, the data Ri may be compared with the original pixel data Rx corresponding to the latest display data dd(r) stored in memory 7 in step S107 or S207. And similar comparison may be performed with respect to any of the other original data Gx, Bx and Yx corresponding respectively to the latest display data dd(g), dd(b) and dd(y).

It is to be understood that the above-described method for forming the compressed data is merely an example, and that some other compressed data may be formed on the condition that m-bit data is obtainable by mapping the original data.

The color display circuit 10 for displaying a color image with the color display data compressed by the method of the second embodiment is fundamentally the same as the aforementioned circuit shown in FIG. 6. However, in the memory 12R, predetermined data have been previously stored in a manner that when the two high-order or most significant bits A7 and A6 of the address A7 to A0 have become "00" of red identification code or "11" of luminance identification code, the most significant bit D8 of the data D8 to D0 is changed to "1", and also that the data of the red component level of the color to be displayed is outputted as the low-order or less significant bits D7 to D0 (red data R'). That is, in the memory 12R are stored "1" (D8) and the red data R' (D7 to D0) in the addresses 00H to 3FH and the addresses C0H to FFH (where H denotes hexadecimal notation).

Meanwhile in the memory 12G, predetermined data have been previously stored in a manner such that when the two most significant bits A7 and A6 of the address A7 to A0 have become "01" of green identification code or "11" of luminance identification code, the most significant bit D8 of the data D8 to D0 is turned to "1", and also that the data of the green component level of the color to be displayed is outputted as the less significant bits D7 to D0 (green data G'). That is, in the memory 12G are stored "1" (D8) and the green data G' (D7 t D0) in the addresses 4 0H to 7FH and the addresses C0H to FFH. Further in the memory 12B. predetermined data have been previously stored in a manner such that when the two most significant bits A7 and A6 of the address A7 to A0 have become "10", of the blue identification code or "11" of the luminance identification code, the most significant bit D8 of the data D8 to D0 is turned to "1", and also that the data of the blue component level of the color to be displayed is outputted as the less significant bits D7 to D0 (blue data B'). That is, in the memory 12B are stored "1" (D8) and the blue data B' (D7 to D0) in the addresses 80H to BFH and the addresses C0H to FFH.

When the two most significant bits of the data dd are "11", the addresses C0H TO FFH of the memories 12R to 12B are designated simultaneously, so that the data R' to B' are outputted simultaneously from the memories 12R to 12B. The values of such output data obtained in this stage are set at the following ratio:

$$R' : G' : B' = 0.3 : 0.59 : 0.11 \quad (1)$$

However, the absolute values of the data R', G' and B' conform to the six less significant bits of the data dd.

The operations of the latch circuits 13R to 13B are fundamentally the same as those in the aforementioned first embodiment. When the data dd from the memory 11 is the luminance data dd(y), the data R' to B' are latched simultaneously in the latch circuits 13R to 13B. In this stage, since the data R' to B' are set at the ratio of Eq. (1), the levels of the signals R to B obtained from the D/A converters 14R to 14B also come to have the same ratio as $$R : G : B = 0.3 : 0.59 : 0.11$$

And the signals R to B serve as luminance signals (brightness information).

Relative to any color having a great saturation change, its post-change display is executed with priority. In addition, a concept of luminance is adopted such that, when there exists a great luminance change in the original data, the signals R to B are simultaneously changed according to the 18 bits present in response to the identification code "11" indicating a change in the luminance of the high display image, thereby achieving a remarkably high resolution.

Figure 9:
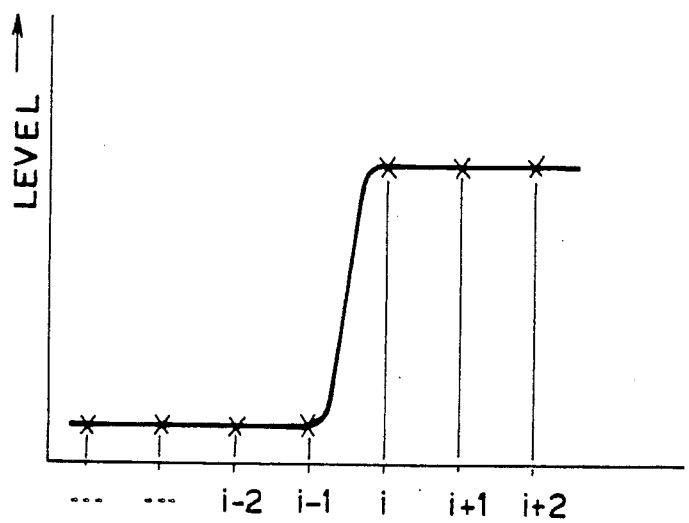
FIG. 9 is a waveform chart which explains the effects of the invention.

Due to adoption of such a luminance concept, there occurs no phenomenon where, for instance, the boundary between black and white portions is colored. That is, in the boundary between black and white portions, the red to blue data (Ri to Bi) change simultaneously to great extent as shown in FIG. 9. And if neither of signals Yi nor $\Delta Y$ is employed, the maximum of the values $\Delta R > \Delta G$ and $\Delta B$, is discriminated in the step S203. For example, under the conditions of $\Delta G > \Delta R$ and $\Delta G > \Delta B$, the value $\Delta G$ is judged to be the maximum and, in the step S205, the data dd(g) is regarded as the data dd of the ith pixel. Consequently, at the display time, the red and blue data of the ith pixel are considered to represent the saturation of the (i−1)th pixel which is immediately anterior to the ith pixel, while the green data is considered to represent the post-change saturation. Therefore in the ith pixel, the green saturation becomes greater than the red and blue saturations, so that the pixel is colored green. The same phenomenon occurs with respect to the next (i+1)th pixel as well.

However, according to the present invention where the signals Yi and $\Delta Y$ are formed with the adoption of this luminance concept, the saturations of the individual colors in the ith pixel are simultaneously changed to consequently avert undesired coloring.

Figure 10:
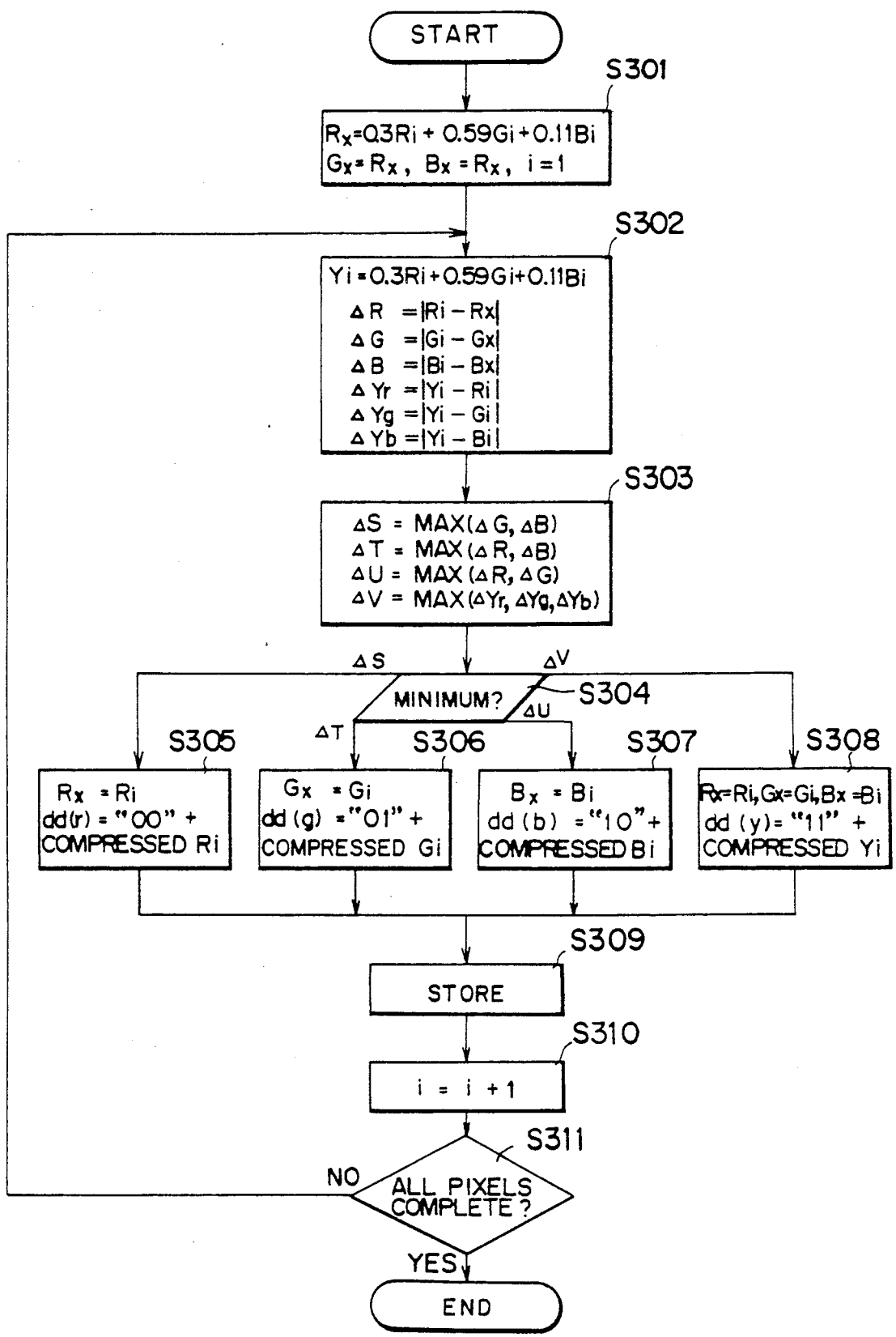
FIG. 10 is a flow chart of a third method of encoding the color signal compressed data according to the invention.

A third embodiment for carrying out the method of color data compression will now be described below with reference to the flow chart of FIG. 10. The 8-bit display data dd compressed by such method has the data format shown in FIG. 8.

First, in a step S301, initial values are set as $$Rx = 0.3 \, Ri + 0.59 \, Gi + 0.11 \, Bi$$

$$Gx = Br, \quad Bx = Rx, \quad i = 1$$

In the above, the values Rx, Gx and Bx are replaced by the values Ri, Gi and Bi respectively, as described similarly in connection with the second embodiment, when the data Ri, Gi and Bi satisfy the below mentioned predetermined conditions.

In the next step S302, the luminance data Yi of the ith pixel is calculated from the data Ri to Bi as $$Yi = 0.3Ri + 0.59Gi + 0.11Bi$$

And there are also calculated the absolute values $\Delta R$ to $\Delta B$ of the differences between the data Ri to Bi and the data Rx to Bx, and the absolute values $\Delta Yr$ to $\Delta Yb$ of the differences between the data Yi and the data Ri to Bi:

$$\Delta R = |Ri - Rx|$$

$$\Delta G = |Gi - Gx|$$

$$\Delta B = |Bi - Bx|$$

$$\Delta Yr = |Yi - Ri|$$

$$\Delta Yg = |Yi - Gi|$$

$$\Delta Yb = |Yi - Bi|$$

Subsequently in a step S303, the greater one of the differences $\Delta G$ and $\Delta B$ is selected as a difference $\Delta S$; the greater one of the differences $\Delta R$ and $\Delta B$ is selected as a difference $\Delta T$; the greater one of the differences $\Delta R$ to $\Delta G$ is selected as a difference $\Delta U$; and the greater one of the differences $\Delta Yr$ to $\Delta Yb$ is selected as a difference $\Delta V$.

In a next step S304, the differences $\Delta S$ to $\Delta V$ are compared with one another so that the minimum is discriminated from among such differences.

If the value $\Delta S$ is judged to be the minimum $\Delta S < \Delta T$, $\Delta S < \Delta U$, $\Delta S < \Delta V$) out of such differences $\Delta S$ to $\Delta V$, it signifies that, when the red data R is renewed to Ri, the greater one of the residual errors $\Delta G$ and $\Delta B$ caused in the green and blue data is smaller than the residual error caused with the renewal of any color data other than the red data. Therefore the data Gi and Bi in this stage can be replaced with the data Gx and Bx of the preceding pixel, hence eliminating the necessity of preliminarily storing the green and blue data Gi and Bi of the ith pixel in the memory. Such a technique enables the preliminary storage of the red data Ri of the ith pixel in the memory, and the requirement is the renewal of the data Rx alone to the data Ri.

The same process as the above may be executed when any of the differences $\Delta T$ to $\Delta V$ is the minimum.

If the difference $\Delta S$ is judged to be the minimum, the process advances to step S305, where Rx is replaced with Ri, and the 8-bit original data Ri is converted to the 6-bit compressed data r. Furthermore, two bits "00" of red identification code are added to the high-order side (MSB side) of the compressed data r as shown in FIG. 8, thereby forming the 8-bit display data dd(r) as a whole.

When the difference $\Delta T$ is judged to be the minimum in step S304, the process advances to step S306, where Gx is replaced with Gi, and the 8-bit original data Gi is converted to the 6-bit compressed data g. Then two bits "01" of the green identification code are added to the MSB side of the compressed data as shown in FIG. 8, thereby forming the 8-bit display data dd(g).

If the difference $\Delta U$ is judged to be the minimum in step S304, the process advances to S307, where Bx is replaced with Bi, and the 8-bit original data Bi is converted to the 6-bit compressed data b. Furthermore, two bits "10" of blue identification code are added to the MSB side of such compressed data as shown in FIG. 8, thereby forming the 8-bit display data dd(b) as a whole.

In the case where the difference $\Delta V$ is judged to be the minimum in step S303, the process advances to a step S308, where Rx, Gx and Bx are replaced with Ri, Gi and Bi respectively, and the 8-bit original data Yi is converted to 6-bit compressed data y. Then two bits "11" of luminance identification code are added to the MSB side of the compressed data as shown in FIG. 8, thereby forming the 8-bit display data dd(y) as a whole.

Subsequently in a next step S309, the data dd(r), dd(g), dd(b) or dd(y) formed in one of the previous steps S305 to S308 is stored as ith pixel display data in the ith address of the memory serving as the storage means.

Thereafter, in step S310, the count parameter i is incremented by 1 so as to process the next pixel. In a step S311, a decision is made as to whether the above process has been completely executed with regard to all pixels and, if any pixel is left unprocessed, the procedure posterior to the step S302 is repeated.

Thus, there is stored in the memory the gradation information as data dd relative to the color or luminance having the maximum level change in comparison with the preceding pixel.

The color display circuit 10 for displaying a color image with the color display data compressed by the method of the third embodiment may be fundamentally the same as the aforementioned circuit shown in FIG. 6, and its operation is the same as that of the second embodiment.

However, in the addresses COH to FFH of the memories 12R to 12B, the same data is stored in each of the memories 12R, 12G and 12B.

When the data dd from the memory 11 is the luminance data dd(y), since its two most significant bits are "11", mutually equal data R', G' and B' are outputted from the entire memories 12R to 12B, and the respective most significant bits D8 are turned to "1". Therefore, the data R', G' and B' are latched simultaneously into the latch circuits 13R, 13G and 13B, and signals R to B, having luminance information (brightness information), are obtained from the A/D converters 14R to 14B.

Consequently, relative to any color having a great gradation change, its post-change display is executed with priority. In addition, a concept of luminance is adopted such that, when there exists a great luminance change in the original data, the signals R to B are simultaneously changed according to the 18 bits present in response to the identification code "11" indicating a change in the luminance of the display image, thereby achieving a remarkably high resolution.

In the case where none of the signals $\Delta Yr$ to $\Delta Yb$ and $\Delta V$ are employed, the minimum of the values $\Delta R$ and $\Delta G$ to $\Delta B$ is discriminated in step S304. For example, under the conditions of $\Delta S < \Delta T$ and $\Delta S < \Delta U$, the value $\Delta S$ is judged to be the minimum. Then, in step S305, the data dd(r) is regarded as the data of the ith pixel. Consequently, at the display time, the green and blue data of the ith pixel are considered to have the level of the preceding pixel such at the (i−1)th pixel, while the red data is considered to have the post-change level. Accordingly, in the ith pixel, the red level becomes higher than the green and blue levels, so that the pixel is colored in red.

However, according to the present invention where the signals $\Delta Yr$ to $\Delta Yb$ and $\Delta V$ are formed with adoption of this luminance concept, the levels of the individual signals R to B in the ith pixel are simultaneously changed to consequently avert an undesired phenomenon such that the boundary between black and white portions is colored. It is to be understood that, for simplifying the circuit configuration, the above-described process relative to the luminance may be omitted as well.

Now a fourth embodiment for carrying out the method of color data compression will be described below with reference to FIG. 11. The data format in this example is shown in FIG. 12A, where 8 bits of display data dd are allocated to one pixel as in the aforementioned first through third embodiments. Fundamentally a control code is composed of the 3 high-order bits, and color saturation data is composed of the 5 low-order bits. When the 3 high-order bits of each of the display data dd(r), dd(g) and dd(b) are "000", the 5 low-order bits of the 8-bit red data Ri compressed to saturation data r. Similarly, when the 3 high-order bits are "001" and "010", the 5 low-order bits of the 8-bit green data Gi and those of the 8-bit blue data Bi are compressed to saturation data g and b, respectively.

In a case where the 3 high-order bits are "011" to "111", the 5 low-order bits represent specific display data dd(j) (where j = 1 to 5) as will be described later. As illustrated in FIG. 4, a region 30 having a distribution of signals R to B is sliced to form 32 layers G'1 to G'32 of, e.g. 5 bits (mg = 5) in parallel with the R-B plane or in the direction of G, and further each Gk of such layers G'1 to G'32 is divided into 32 × 32 subregions 31 of, e.g. 5 bits (mr = 5, mb = 5) relative to the red signal R and the blue signal B. It follows that the red, green and blue gradation data r, g and b belong to any of the subregions 31.

The distribution of the appearance frequency of the subregions 31 is obtained by using the entire pixel data of the image. In this case, any subregion with a high frequency of appearance denotes a color appearing frequently in the image.

The five subregions 31 with the highest frequency of appearance are selected out of each layer G'k of the green layers G'1 to G'32, and the colors of such five subregions 31 are chosen as the representative colors Pj (where j = 1 to 5). The data of the representative colors Pj in each layer Gk are registered as display data dd(j) together with the 5-bit color saturation data obtained by compressing the green data of that layer correspondingly to the control code "011" to "111". Since there are a total of 32 green layers G'1 to G'32 each having 5 representative colors Pj, it follows that 160 representative colors are existent in all. The red, green and blue gradations in the representative colors Pj are regarded as, e.g. the center values of the subregions 31.

In coloring one pixel, a calculation is executed to decide which data of the red, green, blue and representative colors needs to be renewed (while the data of the remaining colors are not renewed) between such pixel and the preceding pixel to achieve the most adequate coloring for the original image, and the color data selected to attain the most adequate coloring is stored as display data dd for the pixel.

Figure 11:
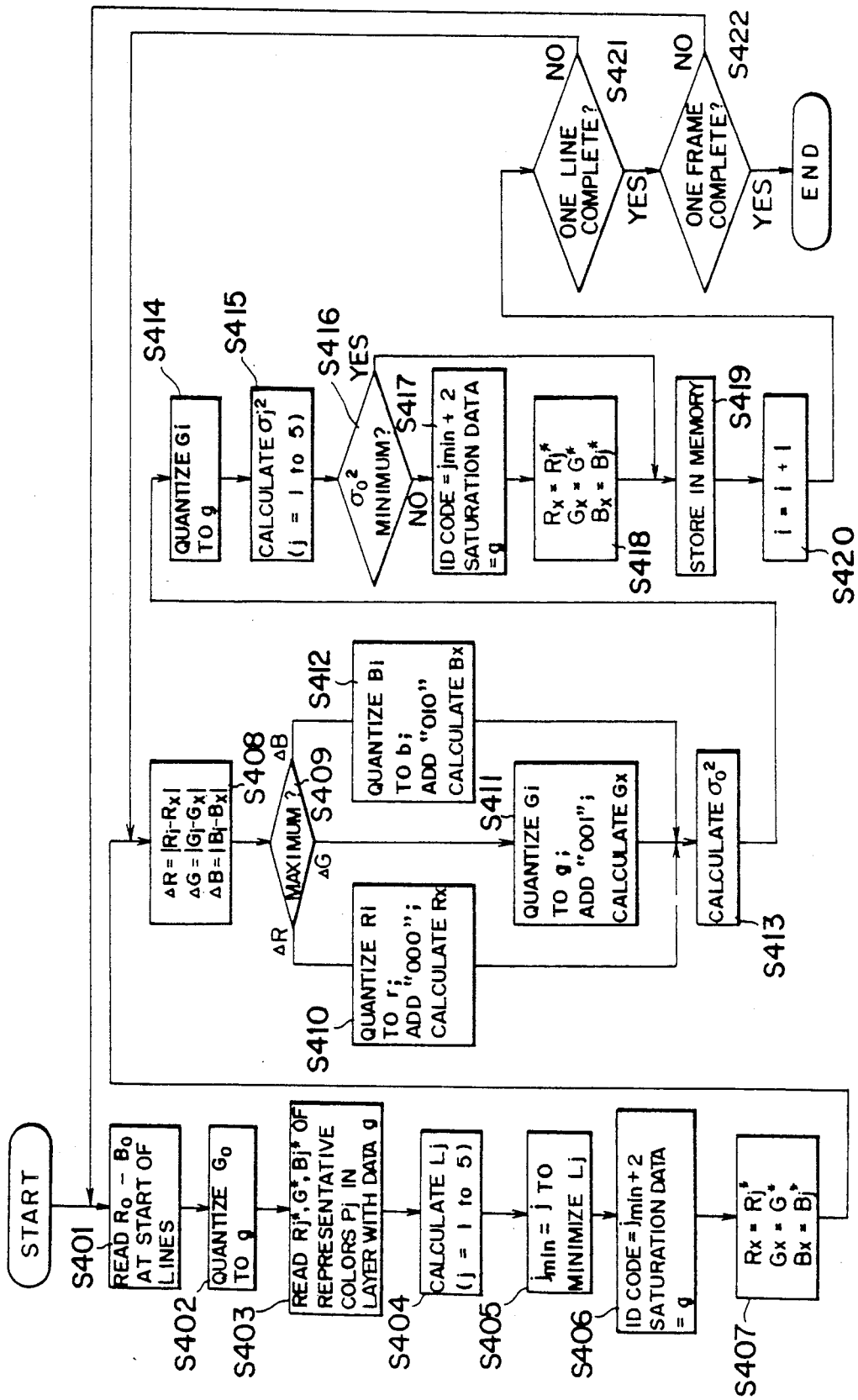
FIG. 11 is a flow chart of a fourth method of encoding the color signal compressed data according to the invention.

As shown in FIG. 11, the pixel data at the start of each horizontal line is initialized in steps S401 through S405. To perform this operation, in the first step S401, the pixel data $R_0$ to $B_0$ at the start of a horizontal line are read out from memories 3R to 3B. In the next step S402, the data $G_0$ out of the entire data $R_0$ to $B_0$ read out in the step S401 is requantized with 5 bits on the basis of the dynamic range of the region shown in FIG. 4, thereby forming data g.

Subsequently in the step S403, there are read out the data $Rj^*$, $G^*$, $Bj^*$ (where j=1 to 5) of the representative colors Pj in the layer including the data g out of the layers G'1 to G'32 in the region 30. And the color intra-block distance Lj between such data $Rj^*$, $G^*$, $Bj^*$ and the data $R_0$, $G_0$, $B_0$ read out in the step S401 is calculated in the step S404 according to the following equation:

$$Lj = \sqrt{(R_0 - Rj^*)^2 + (G_0 - G^*)^2 + (B_0 - Bj^*)^2}$$

where j=1 to 5. Subsequently the minimum value $j_{min}$ of the distance Lj is obtained in the step S405, and the control code and the gradation data are set as follows in the step S406.

*Control code b7 to b5* $= j_{min} + 2$

*Gradation data b4 to b0* $= g$

In the control code, addition of 2 in $j_{min} + 2$ is based on the fact that 0 to 2 of the control code are allocated to red to blue, and 3 to 7 thereof are allocated to the representative colors Pj. In step S407, the replacement values Rx, Gx, Bx are obtained as $Rx = Rj^*$, $Gx = G^*$, $Bx = Bj^*$ The data of each pixel are produced in steps S408 to S419 in the following manner. First, in the step S408, the next pixel data Ri to Bi are read out from the memories 3R to 3B, and the differences $\Delta R$, $\Delta G$, $\Delta B$ between such next pixel data Ri to Bi and the replacement values Rx to Bx (in this example, the values obtained in step S407) are calculated as $\Delta R = |Ri - Rx|$ $\Delta G = |Gi - Gx|$ $\Delta B = |Bi - Bx|$ And in a next step S409, the maximum value of such differences $\Delta R$ to $\Delta B$ is discriminated. When the difference $\Delta R$ is judged to be the maximum, the process advances to a step S410, where the data Ri out of the entire data Ri to Bi read out in the step S408 is quantized with 5 bits on the basis of the dynamic range of the region 30 as shown in the step S402, thereby forming data r as $$r = \frac{(Ri - R_{min}) \times 2^5}{R_{max} - R_{min} + 1}$$

And the control code and the gradation data are set as

*Control code* $= $ "000"

*Gradation data* $= r$

Furthermore, the replacement value Rx is calculated as $$Rx = (r + \tfrac{1}{2}) \cdot (R_{max} - R_{min} + 1)/2^5 + R_{min}$$

If the difference $\Delta G$ or $\Delta B$ is judged to be the maximum in step S409, the foregoing process of step S410 is executed similarly in Step S411 or S412:

$$g = \frac{(Gi - G_{min}) \times 2^5}{G_{max} - G_{min} + 1}$$

*Control code* $= $ "001"

*Graduation data* $= g$ $Gx = (g + \tfrac{1}{2}) \cdot (G_{max} - G_{min} + 1) \cdot 2^5 + G_{min}$ $$b = \frac{(Bi - B_{min}) \times 2^5}{B_{max} - B_{min} + 1}$$

*Control code* $= $ "010"

*Graduation data* $= b$ $Bx = (b + \tfrac{1}{2}) \cdot (B_{max} - B_{min} + 1)/2^5 + B_{min}$ Subsequent, to step S410, S411 or S412, the square of the residual error $\sigma 0$ is calculated in step S413 as $\sigma 0^2 = (Ri - Rx)^2 + (Gi - Gx)^2 \cdot (Bi - Bx)^2$ In step S414, the data Gi out of the present pixel data Ri to Bi is quantized with 5 bits on the basis of the dynamic range of the region 30 similar to the aforementioned process in step S402, thereby forming the data g.

$$g = \frac{(Gi - G_{min}) \times 2^5}{G_{max} - G_{min} + 1}$$

In the next step S415, there is calculated the square of the residual error $\sigma j$ caused when using 5 representative colors Pj (where j=1 to 5) in the layer including the data g out of the layers G'1 to G'32 in the region 30.

$\sigma j^2 = (Ri - Rj^*)^2 + (Gi - G^*)^2 + (Bi - Bj^*)^2$ where j=1 to 5. Then in step S416, the value $\sigma 0^2$ obtained in the step S413 is compared with the values $\sigma j^2$ obtained in the step S415, and a check is executed as to whether $\sigma 0^2$ is the minimum value.

In the case where the value $\sigma 0^2$ is not the minimum, that is, when one of the values $\sigma j^2$ is minimum, the process advances to step S417 where the control code and the gradation data are set as follows with respect to the $j_{min}$th representative color Pj having the minimum value $\sigma j_2$.

*Control code* $= j_{min} + 2$

*Gradation data* $= g$

Subsequently in step S418, the replacement values Rx to Bx are obtained for the next pixel as $Rx = Rj^*$, $Gx = G^*$, $Bx = Bj^*$ And then the process advances to step S419.

When the value $\sigma 0^2$ is judged to be the minimum in step S416, the process jumps to step S419 while omitting steps S417 and S418.

In step S419, the data dd obtained in one of the steps S410 to S412 or in step S417 is written as the present pixel data in the memory.

Thereafter the count parameter i is incremented by 1 in step S420, and then a check is executed in step S421 as to whether the above-described data processing procedure has been completed or not with regard to all pixels of the present horizontal line. And if the result of such check is no, the process then returns to step S408, and the same procedure is repeated as described for the next pixel.

Upon completion of the data processing procedure for all pixels of the present horizontal line, the process advances from step S421 to the next step S422, where a check is executed as to whether the aforementioned data processing procedure has been completed or not with regard to all horizontal lines. And if the result is no, the process returns to the step S401 and thereafter the foregoing procedure is repeated as described for the pixels of the next horizontal line.

This program is terminated upon completion of the data processing procedure for each pixel every horizontal line, whereby the data dd compressed to 8 bits per pixel is stored in a floppy disk 8 or the like. The video display circuit 10 for displaying the data compressed in the above fourth embodiment is constituted as follows. In FIG. 6, predetermined data have been previously stored in memory 12R in a manner such that, when the three high-order or most significant bits A7 to A5 of the address A7 to A0 have become "000" of the red control code or "011" to "111" of the representative color control codes, the most significant bit D8 of the data D6 to D0 is turned to "1", and also that the data of the red component level of the color to be displayed is outputted as the low-order or less significant bits D7 to D0 (red data r').

Meanwhile in the memory 12G, predetermined data have been previously stored in a manner such that when the three most significant bits A7 to A5 of the address A7 to A0 have become "001" of the green control code or "011" to "111" of the representative color control code, the most significant bit D8 of the data D8 to D0 is turned to "1", and also that the data of the green component level of the color to be displayed is outputted as the less significant bits D7 to D0 (green data G').

Further in the memory 12B, predetermined data have been previously stored in a manner such that when the three most significant bits A7 to A5 of the address A7 to A0 have taken the value "010" of the blue control code or "011" to "111" of the representative color control codes, the most significant bit D8 of the data D8 to D0 is changed to "1", and also that the data of the blue component level of the color to be displayed is outputted as the less significant bits D7 to D0 (blue data B').

Accordingly, discrimination is executed per pixel as to whether the data dd is the red, green, blue or representative color data by the control code, so that the color data of each pixel having the maximum gradation change in comparison with the preceding pixel is discriminated. Then the data in one of the latch circuits 13R to 13B is renewed in accordance with the color having the maximum gradation change, and the signals R to B are taken out.

Thus the three primary color signals R to B can be obtained In the present invention where 5 bits are allocated to each of the red, green and blue data, there are also provided a total of 160 representative colors. It follows that one color is expressed with 15 bits to consequently realize the simultaneous production of $2^{15} = 32,768$ colors. Therefore, even a natural image can be reproduced with sufficient gradation so that its original naturalness and lustrous color is preserved.

Furthermore, due to this adaptive process using representative colors, color blur is eliminated thereby averting deterioration of the resolution. In addition, since the data in the memories 12R to 12B constituting the color look-up table are formed in terms of statistical characteristics, high efficiency is attained in the color compression. The desired color compression can be obtained by using mapping techniques and eliminates the need for any particular additional circuitry.

FIG. 12B shows another example of the composition of the video display data dd. In this example, 6 bits are allocated to each of the red, green and blue data, so that a total of $2^{18} = 262,244$ colors can be produced and used in combination with a total of 24 layers $\times 4 = 96$ representative colors.

In deciding the representative colors by the method described, there arises the problem of color blur in some image portions such as the edges if the frequency of appearance of the colors is not uniform throughout the image.

Figure 13A:
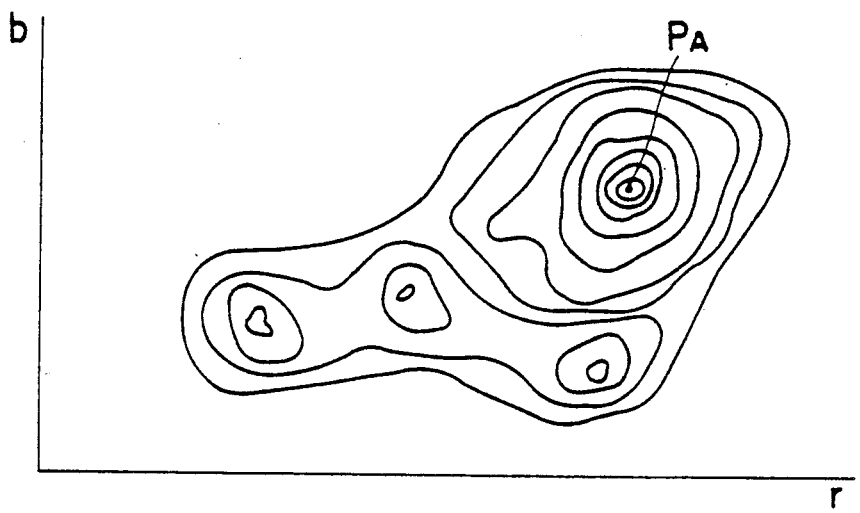
FIGS. 13A and 13B are conceptual diagrams which illustrate methods of choosing a representative color as shown in FIGS. 14 and 15.

Suppose now that distribution of the frequency of color appearance of red to blue in one layer G'k out of the green layers G'1 to G'32 is such as illustrated in FIG. 13A, where the curves are drawn, like contour lines in a map, by connecting the points (colors) with the same appearance frequency in the R-B coordinate system. In this case it signifies that the point $P_A$ (i.e. the color at point $P_A$) appears most frequently.

Considering such case where the appearance frequency is concentrated at the point $P_A$, if the five points with the highest appearance frequencies are selected as the representative points, and the colors at such selected points are determined to be representative colors Pj (where j=1 to 5) in the layer G'k, then the five representative points providing such representative colors Pj will all be concentrated in the vicinity of the point $P_A$, so that selection of these five representative points or colors Pj is ineffective and will eventually result in the loss of efficiency.

Figure 13B:
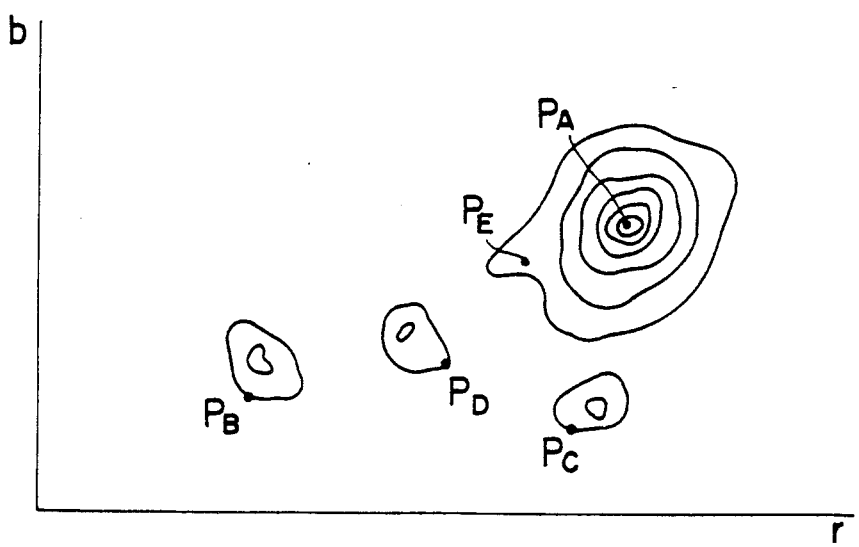

Therefore, in the present invention, the following process is executed with regard to each green layer G'k. Relative to the highest appearance frequency Nmax (in this case at the point $P_A$) a value Nx is calculated as $Nx = Nmax/M$ where M is an integer greater than 1, such as 100. Then any appearance frequency whose value is less than Nx is eliminated, so that the resulting distribution consists of those frequencies whose values are higher than the value Nx, as is illustrated in FIG. 13B. In this case, the appearance frequencies thus cut off are less than 1/M of the highest appearance frequency Nmax, e.g., less than 1% when M is 100, whereby the influence of the frequencies cut off in this mode of operation is negligible.

In a such modified distribution of the appearance frequency, the point $P_A$ is selected as the 1st representative point, next a point $P_B$ farthest from the point $P_A$ is selected as the 2nd representative point. Subsequently a point $P_C$ farthest from both points $P_A$ and $P_B$ is selected as the 3rd representative point, and thereafter points $P_D$ and $P_E$ farthest from all of the representative points already set are selected as 4th and 5th representative points respectively.

Then, the data of the 1st to 5th representative colors P1 to P5 is obtained from the 1st to 5th representative points thus selected.

Thus, the 1st to 5th representative points are selected such that their appearance frequencies are higher than a certain degree and their positions are sufficiently spread in the space.

Figure 14:
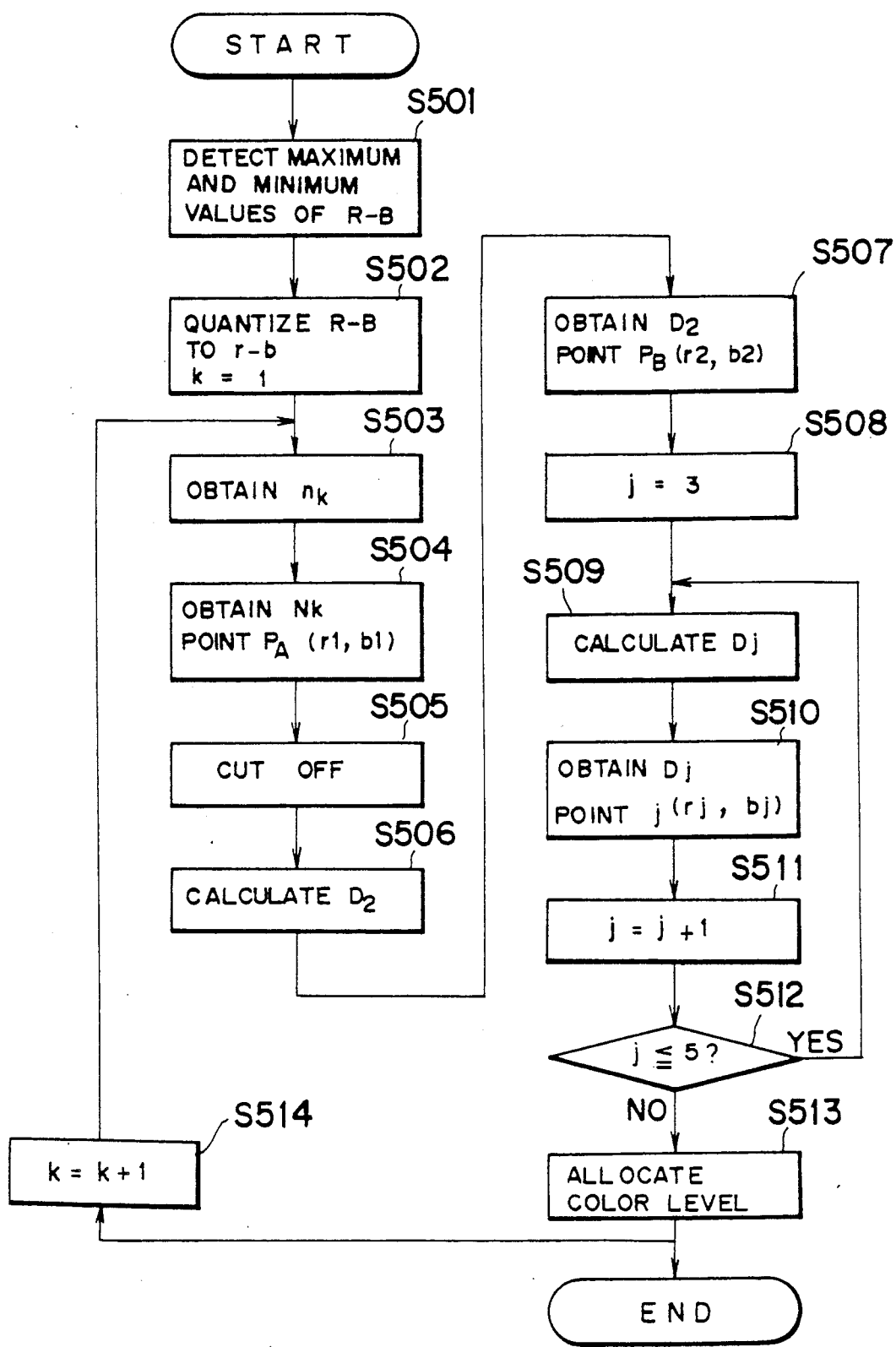
FIG. 14 is a flow chart of a first embodiment of the method of choosing a representative color.

The program shown in FIG. 14 is executed by the CPU 5 to select the representative colors Pj in each of the green layers G'1 to G'32.

When the program is started, in the first step S501, the minimum values Rmin to Bmin and the maximum values Rmax to Bmax are determined from the one-frame data of the memories 3R to 3B. In the next step S502, the data R to B are requantized with 5 bits on the basis of the dynamic range of the region 30 as $$r = \frac{(R - Rmin) \times 2^5}{Rmax - Rmin + 1}$$

$$g = \frac{(G - Gmin) \times 2^5}{Gmax - Gmin + 1}$$

$$b = \frac{(B - Bmin) \times 2^5}{Bmax - Bmin + 1}$$

where the count parameter k is 1. Subsequently in step S503, there is calculated the per color frequency distribution of the data r to b, i.e., the appearance frequency $n_k$ of each color (in the r-b coordinate system) in the green layers G'k (where k=1 to 32).

In the next step S504, there are found the highest appearance frequency $N_k$ in each of the green layers G'k, and also the coordinates (r1, b1 corresponding to the point $P_A$) where such value Nk is located. In step S505, any appearance frequencies under the value $n_k$ are cut off. When M=100 for example, the appearance frequency $n_k$ defined as $n_k < N_k/100$ is regarded as $n_k = 0$.

Subsequently, in step S506, there is calculated the distance D2 from the highest appearance frequency point (r1, b1) in comparison with each appearance frequency point $(r_n, b_n)$, where $n_k \neq 0$.

$$D2 = \sqrt{(rn - r1)^2 + (bn - b1)^2}$$

In step S507 are found are found the longest distance D2 and the coordinates (r2, b2) corresponding to a point $P_B$ where the distance D2 is maximum.

In step S508, the value j is set to 3 for a point $P_c$. Then in step S509, there is calculated each distance D]from the points (r1, b1)−(rj−1, bj−1) in comparison with the points (rn, bn) where the appearance frequency $n_k=0$. An in the next step S510, there are found the longest distance Dj and the coordinates (rj, bj) corresponding to a jth point where the distance Dj is maximum.

Subsequently the value j is incremented by 1 in step S511, and then a check is executed as to whether j≦5 or not in step S512. In the case where j≦5, the process returns to step S509. Accordingly, in the steps S509 to S511 are calculated the 4th and 5th points (r4, b4), (r5, b5) and the distances D4, D5 therefrom.

Since j>5 in the next step S512, the process advances to step S513, where color levels Rj*, G*, Bj* are allocated to the representative points (rj, bj) (where j=1 to 5) in the green layers G'k:

$$Rj^* = (rj - \tfrac{1}{2}) \times (Rmax - Rmin + 1)/2^5 + Rmin$$

$$G^* = (g = \tfrac{1}{2}) \times (Gmax - Gmin + 1)/2^5 + Gmin$$

$$Bj^* = (bj - \tfrac{1}{2}) \times (Bmax - Bmin + 1)/2^5 + Bmin$$

The count parameter k is incremented in step S514. The foregoing operation is then repeated with the parameter k changed in sequence until the program is executed completely.

According to the present invention, the representative points (rj, bj) in each green layer G'k are thus determined. In particular, such representative points are spaced sufficiently far apart from one another within each green layer G'k and are so selected that the color appearance frequencies thereat are higher than a certain degree in each layer G'k, whereby selection of the representative points and colors results in high efficiency. Even in an image where the color appearance frequencies are locally concentrated, it is still possible to obtain an adequate selection of representative colors both in magnitude and spatial spread.

Furthermore, since the process required for such selection is realizable merely by the repetition of routines, fast operations can be performed, and its execution by hardware is also effected simply and quickly.

In the above-described embodiments, the representative points and colors are determined in accordance with the distribution of the appearance frequencies within each of the green layers G'k. However, it is to be understood that three-dimensional determination of representative points and colors can also be attained with reference to the distributions of appearance frequencies in the other two green layers above and below the desired layer to be processed.

In another embodiment of the present invention, the adaptive mapping of representative colors is executed by first finding a pixel of an edge portion or the like where the difference between such pixel and the adjacent pixel becomes greater than a predetermined threshold value, then calculating the appearance frequencies of the colors corresponding to the mutually adjacent pixels and appearing in each subdivision of the color space, and using the selected colors of higher appearance frequencies with priority.

Now the method of selecting such representative colors will be described below with reference to FIG. 15.

First, in step S601, relative to the colors used in one frame of the color image to be processed and developed in the R, G, B color spaces as shown in FIG. 4, the maximum and minimum values (Rmax, Rmin, Gmax, Gmin, Bmax, Bmin) along the respective axes of the primary color data are calculated.

In the next step S602, a decision is made as to whether the present pixel is as the start of a horizontal line. If the result of such decision is yes, the process advances to a step S607; and when the result is no, the process may advance to a step S605 in FIG. 5. However, to reduce the number of calculations in this embodiment, it is assumed that the process next advances to steps S603 and S604 so as to narrow down the selection of the edge pixel.

In the step S603, there are obtained the absolute values of the respective differences between the digital primary color data Ri, Gi, Bi of the present pixel (generally ith pixel) and the primary color data Ri−1, Gi−1, Bi−1 of the preceding (1−i)th pixel adjacent to the ith pixel, and then the sum Δi′ of such absolute values is calculated a $$\Delta i' = |Ri - Ri - 1| + |Gi - Gi - 1| + |Bi - Bi - 1|$$

And in the next step S604, a decision is made as to whether the sum Δi′ is greater than a specific threshold value Eth′ (i.e. Δi′≧Eth′) predetermined to discriminate the edge. The process advances to step S605 if the result of such decision is yes, or to step S609 in the case of no. In the steps S603 and S604, it is determined if there is, in one frame of the color image, a pixel of edge or contour portion having a great signal change in comparison with the adjacent pixel. The pixel thus detected in this step represents a signal change along the scanning direction in the display of the image, e.g., an edge pixel in the horizontal direction.

Subsequently in step S605, there is calculated the intermediate value (or 2nd value) Δi out of the absolute values of the respective differences between the digital primary color data Ri, Gi, Bi of the present ith pixel and the primary color data Ri−1, Gi−1, Bi−1 of the preceding (i−1)th pixel adjacent to the ith pixel:

$$\Delta i = Intermediate\ value\{|Ri - Ri - 1|, |Gi - Gi - 1|, |Bi - Bi - 1|\}.$$

In the next step S606, a decision is made as to whether the intermediate value Δi is greater than a specific threshold value Eth (i.e. Δi≧Eth) predetermined to discriminate the edge. Then the process advances to step S607 if the result of such decision is yes, or to step S609 in the case of no.

In the steps S605 and S606, relative to the compressed color display data with color identification code added to the compressed saturation data of the color having the maximum saturation change between mutually adjacent pixels as in the adaptive mapping described previously, there is determined the maximum difference between the color data obtained by restoring the compressed color display data and the color data of the original color image. Since the maximum of the absolute values of the respective differences between the above-described primary color data is employed as the saturation data out of the compressed data in the adaptive mapping, substantially no contribution is made to the difference between the restored data and the original color data. Considering such fact, the 2nd value Δi is compared with the predetermined threshold value Eth to detect the pixels where the difference between the restored data and the original color data is great. The pixels thus detected represent the deteriorated portion in the adaptive mapping process more exactly than the pixels detected in the steps S603 and S604, but discrimination between the large and small differential values is still needed and therefore necessitates mathematical operations similar to the adaptive mapping process. On the other hand, in steps S603 and S604, the purpose is merely to find the sum of the absolute values of the respective differences between the mutually adjacent pixels with regard to the digital primary color data R, G, B of the original color image, and the discrimination between the large and small differential values is not needed which simplifies the calculation. Accordingly, the overall processing speed can be increased by previously narrowing down, in the steps S603 and S604, the pixels used in mathematical operations in steps S605 and S606, and thereby reducing the amount of required calculations in steps S605 and S606. It is a matter of course that the decision levels in the steps S606 and S604 can be controlled by properly adjusting the specific threshold values Eth and Eth′. Either the steps S603 and S604, or steps S605 and S606, may be omitted as well.

In step S607, each range of values between the maximum and minimum values of the color space per primary color axis is requantized with 5 bits, and the digital primary color data Ri, Gi, Bi of the ith pixel are compressed to color saturation data ri, gi, bi each composed of 5 bits. Specifically, the calculations for such requantization are executed as $$ri = (Ri - Rmin) \times 2^5 / (Rmax - Rmin + 1)$$

$$gi = (Gi - Gmin) \times 2^5 / (Gmax - Gmin + 1)$$

$$Bi = (Bi - Bmin) \times 2^5 / (Bmax - Bmin + 1)$$

Subsequently in step S608 are counted the color appearance frequencies f (r, g, b) in the color space compressed along each axis of the requantized color saturation data r, g, b. In this step, the range between the maximum value Gmax and the minimum value Gmin on the G-axis in the color space shown in FIG. 4 is requantized to obtain 32 divisions each composed of 5 bits, thereby forming 32 equivalent g-planes in the individual quantization step. Each of the ranges Rmax-Rmin and Bmax-Bmin is requantized with 5 bits to such 32 g-planes, then each of the g-planes is divided into 32×32=1024 subregions, and the color appearance frequencies f (r, g, b) in the entire field of pixels of one frame are counted for each subregion.

In step S609 where the next (i+1)th pixel adjacent to the present pixel is processed, the count parameter i is incremented by 1 as (i=i+1).

Subsequently in step S610, a decision is made as to whether the above procedure has been completed or not with regard to the entire field of pixels in one frame of the color image. The process advances to step S611 if the result of such decision is yes, or returns to the step S602 in the case of no.

In step S611, there are obtained the maximum value of the appearance frequencies f (r, g, b) per g-plane shown in FIG. 4, and also the values of r and b (coordinates on the r-axis and b-axis in the compressed color space). On the g-plane corresponding to one address k (k=0 to 31) on the g-axis in the compressed color space, the color appearance frequency f (r, g, b) can be expressed as a function f (r, k, b) or $f_{g=k}$ (r, b) where the value of g is fixed to the above k. If the function with such parameters r and b is plotted by means of contour lines (appearance frequency lines) as illustrated in FIG. 13A, the calculation of the maximum appearance frequency corresponds to the calculation of the coordinates $(r_A, b_A)_{g=k}$ of the highest point $P_A$ in the contour line representation, and the point $P_A$ denotes a 1st representative color in each of the g-planes. Such process is executed with regard to the entire g-planes, i.e. to each value of k ranging from 0 to 31.

In a next step S612, lower appearance frequencies are cut off out of the above-described frequencies f (r, g, b) with regard to each g-plane. For example, on the g-plane where the g-axis address has a value k (k=0 to 31), the appearance frequencies less than 1% of the maximum frequency at the point $P_A$ are cut off out of the aforementioned f (r, k, b) or $f_{g=k}$ (r, b) as $f_{g=k}(r, b) < 0.01 \times \max(f_{g=k}(r, b))$ In this case, the aforementioned function is set as $f_{g=k}(r, b) = 0$ As shown in FIG. 13B, this process corresponds to the removal of the low level portions out of all of the contour lines shown in FIG. 13A, and such process may be executed with regard to all pixels on each g-plane. Such removal or cut-off of lower appearance frequencies is necessary for avoiding any false contour or edge in the color image.

Subsequently, in step S613, a point farthest from the aforesaid point (e.g. $P_A$ in FIG. 13B) of the 1st representative color is selected as a 2nd representative point on each g-plane. Relative to the significant region (e.g. island portion remaining in FIG. 13B) after the cut-off process is executed in step S612, the distance $L_B(r, b)_g$, is found, that is the subregion Coordinates $(r_B, b_B)_g$ where such maximum value is obtained. In FIG. 13B, the point having the longest distance from the point $P_A$ is selected as a point $P_B$, which is determined to be the 2nd representative point on the g-plane.

In the significant region (island portion in FIG. 13B) left, posterior to the cut-off of the color appearance frequency distribution at a predetermined frequency, with regard to the pixels corresponding to edge, contour or the like where the aforementioned deterioration is prone to occur, selection of any representative points other than the maximum frequency point $P_A$ is based on the condition that none of the display colors becomes conspicuously different from the original color and also that none of the points is extremely far from the representative color in the significant region. For this reason the point $P_B$ farthest from the 1st representative point $P_A$ is selected as the second representative point, and thereafter a point farthest from such two representative points is selected as the next representative point.

In the next step S614, the count parameter j is set to 3. This numerical value 3 corresponds to selection of a 3rd representative point in addition to the 1st representative point $P_A$ of the maximum appearance frequency and the 2nd representative point $P_B$ farthest from the point $P_A$.

In step S615, a point farthest from the foregoing representative points $P_A$, $P_B$ and so forth is selected as the next representative point; and in step S616, the count parameter j is incremented by 1 as (j=j+1). The routines of the steps S615 and S616 are repeated until the count parameter j is set to 6 in a next step S617 (or during the period of time in which the condition j≦5 is satisfied).

First, in step S615, all the distances from the points $P_A$, $P_B$ and so forth are found in each subregion of the significant region per g-plane after the frequency cut-off process, and the subregion having the maximum distance is selected as the next representative point. In this case, the representative point obtained with j=3 is selected as the point $P_C$ in FIG. 13B, the point with j=4 is selected as the point $P_D$, and the point with j=5 is selected as the point $P_E$, respectively.

In the selection of the five representative points, the lower appearance frequencies have been previously removed, and the significant region posterior to such cut-off process is uniformly divided regardless of the appearance frequencies. In this embodiment, five representative points are selected on each of the 32 g-planes, so that a total of 160 points (representative colors) can be obtained in the color space.

A decision is made in step S617 as to whether the count parameter k is equal to or greater than 6 (j≧6), and when the result is yes, the process advances to the next step S618.

In step S618, representative colors of primary red, green, blue data R*, G*, B* are allocated to the five representative points on each of the g-planes. Assuming that the 1st to 5th representative points are at the coordinates (rj, bj) (where j=1 to 5) on the g-plane, then the respective primary color data R*j, G*, B*j at the representative points can be obtained as follows $R^*j = (rj + \frac{1}{2}) \times (Rmax - Rmin + 1) / 2^5 + Rmin$ $G^* = (g + \frac{1}{2}) \times (Gmax - Gmin + 1) / 2^5 + Gmin$ $B^*j = (bj + \frac{1}{2}) \times (Bmax - Bmin + 1) / 2^5 + Bmin$ Such calculations are executed with regard to the entire 32 g-planes to consequently obtain 260 representative colors corresponding to a total of 260 sets of the three primary color data (R*, G*, B*).

As described above, the five representative points on each g-plane are selected from the colors of the pixels where deterioration of the color image is prone to occur. Moreover, the colors of the lower appearance frequencies have been already cut off, and the significant region posterior to such cut-off process is divided uniformly regardless of the appearance frequencies, so that it becomes possible to eliminate any harmful influence of granular noise or false contour known heretofore to cause problems in the conventional method of division. Furthermore, last follow-up is also made possible with the above-described adaptive mapping by using single color renewal.

The 160 representative colors thus selected are mapped by the aforementioned method to form the display data dd shown in FIG. 12A. With regard to any pixel where image deterioration is prone to occur, or for the pixel at the start of each horizontal line, another mapping is performed by the use of such 160 representative colors. The pixels to be processed with the representative color mapping include, for example, those at the start of individual horizontal lines and the pixels where the sum of the absolute values of the primary-color data differences between mutually adjacent pixels become greater than a specific threshold value, as chosen in the steps S605 and S606 of FIG. 15 In addition, a modified method may also be carried out by first detecting, in the color space, the distance or error between the restored three primary color data obtained by the adaptive mapping of the data dd(r), dd(g), dd(b) and the three primary color data of the original color image; then comparing, in the color space, such detected distance or error with that between the three primary color data obtained by the representative color mapping and the three primary color data of the original color image; and adopting, as the color display data, the primary color data which will reduce the distance or error.

According to the color data compression method of this invention, as is apparent from the description give above, adaptive mapping is performed, with regard to any portion of the color image having a large area across which occurs a gradual color change, so as to provide the present color display data on the basis of the difference between the mutually adjacent pixels, thereby achieving a smooth display with satisfactory color reproducibility. In addition, any part of the image where the difference between the restored data and the precompression color data is great, such as at an edge portion or at the start of a horizontal line, has been previously detected in the adaptive mapping, and the representative colors are selected on the basis of the pixel colors of such image portions. In this case another mapping is performed by the use of such selected representative colors, whereby adequate color representation can be accomplished even in an image portion where the color data difference becomes great (such as in the aforementioned adaptive mapping), hence achieving remarkable improvements in the overall image quality.

It is to be understood that the present invention is not limited to the above-described embodiments alone. In accordance with any apparatus or system employed, some proper modifications may be contrived with respect to, for example, the number of bits of the digital primary color data or the compressed data per pixel, or the number of bits of the control code or the color saturation data mentioned in each of the embodiments.

What is claimed is:

1. An apparatus for processing color display signals, comprising:
   color data generating means for generating a plurality of color data signals, each consisting of a predetermined number of bits and representing a respective one of a plurality of color components of a corresponding pixel;
   transmission data generating means for generating a series of transmission data signals based on said color data signals and each representing a respective pixel and consisting of no more than said predetermined number of bits, said transmission data generating means including a central processing unit programmed for comparing at least two of said color data signals, each representing a respective color component of a first pixel, with corresponding color data signals of a second pixel adjacent to and preceding said first pixel to produce respective differential values for each said comparison, said central processing unit being further programmed for selecting as the transmission data signal representing said first pixel, one of said at least two color data signals of said first pixel having a maximum differential value with respect to said corresponding color data signals of said second pixel, and for combining in each said transmission data signal identification data identifying the respective color component and code data corresponding to a value of the respective color component;
   receiving means for receiving said transmission data signals for said pixels;
   a plurality of memory means each for storing display data signals representing a respective one of said color components;
   means responsive to said identification data in said selected one of the transmission data signals which is received for renewing said display data signals stored in a corresponding one of said memory means, the display data signals which are renewed corresponding with a color identified by said identification data and having a renewed value corresponding to said code data in the received transmission data signal; and
   means for supplying the display data signals stored in said memory means to a display means.

2. The apparatus according to claim 1, wherein said color data generating means is operative to generate said plurality of color data signals such that each of said color data signals represents a respective primary color.

3. The apparatus according to claim 1, wherein said central processing unit is programmed to generate said code data as a compressed form of said color data signals.

* * * * *